United States Patent [19]

Moser

[11] Patent Number: 5,269,647
[45] Date of Patent: Dec. 14, 1993

[54] WIND-POWERED ROTOR

[76] Inventor: Josef Moser, Erlenstrasse 2,, D-8058 Pretzen, Fed. Rep. of Germany

[21] Appl. No.: 499,255
[22] PCT Filed: Sep. 22, 1989
[86] PCT No.: PCT/EP89/01103
    § 371 Date: Aug. 3, 1990
    § 102(e) Date: Aug. 3, 1990
[87] PCT Pub. No.: WO90/04102
    PCT Pub. Date: Apr. 19, 1990

[30] Foreign Application Priority Data

| Oct. 3, 1988 | [DE] | Fed. Rep. of Germany | 3833607 |
| Mar. 17, 1989 | [DE] | Fed. Rep. of Germany | 3908880 |
| May 8, 1989 | [DE] | Fed. Rep. of Germany | 3915027 |
| May 24, 1989 | [DE] | Fed. Rep. of Germany | 3916985 |

[51] Int. Cl.$^5$ ............................................. F03B 15/06
[52] U.S. Cl. ........................... 415/2.1; 415/4.2; 415/4.4; 415/905; 415/907; 416/227 R; 416/227 A
[58] Field of Search ............ 416/227 R, 227 A; 415/2.1, 4.1, 4.2, 905, 907, 4.4

[56] References Cited

U.S. PATENT DOCUMENTS

| 1,740,596 | 12/1929 | Hohlt | 416/227 A X |
| 1,835,018 | 12/1931 | Darrieus | 416/227 A X |
| 4,012,163 | 3/1977 | Baumgartner et al. | 415/907 X |
| 4,115,032 | 9/1978 | Lange | 416/227 A |
| 4,204,796 | 5/1980 | Pack, Jr. | 415/4.4 |
| 4,207,026 | 6/1980 | Kushto . | |
| 4,236,866 | 12/1980 | Zapata Martinez . | |
| 4,264,279 | 4/1981 | Dereng | 416/227 A |
| 4,293,279 | 10/1981 | Bolie | 416/227 A |
| 4,430,044 | 2/1984 | Liljegren . | |
| 4,561,826 | 12/1985 | Taylor . | |
| 4,624,624 | 11/1986 | Yum | 416/227 A X |
| 4,808,074 | 2/1989 | South | 416/227 R X |

FOREIGN PATENT DOCUMENTS

| 890537 | 10/1981 | Belgium . | |
| 95600 | 12/1983 | European Pat. Off. . | |
| 3730401 | 10/1977 | Fed. Rep. of Germany . | |
| 3017357 | 11/1981 | Fed. Rep. of Germany . | |
| 3234170 | 5/1983 | Fed. Rep. of Germany . | |
| 3529474 | 10/1986 | Fed. Rep. of Germany . | |
| 3517752 | 11/1986 | Fed. Rep. of Germany . | |
| 2287527 | 5/1976 | France . | |
| 2345600 | 10/1977 | France . | |
| 2435613 | 4/1980 | France . | |
| 551 | of 1856 | United Kingdom | 416/227 A |
| 7210 | of 1905 | United Kingdom | 416/227 |
| 8202747 | 8/1982 | World Int. Prop. O. . | |

OTHER PUBLICATIONS

Development of 1 KW Vertical Axis Wind Generator, Conference Paper From Sun: Mankind's Future Source of Energy in New Delhi, India (Jan. 1978), by Guta and Chandra.

Primary Examiner—Edward K. Look
Assistant Examiner—Todd Mattingly
Attorney, Agent, or Firm—Keck, Mahin & Cate

[57] ABSTRACT

The present invention relates to a rotor driven by wind power with a vertical rotating axis and radial arms distributed at uniform angular intervals over its periphery which bear bodies with an aerodynamic profile such that one side of the profile exhibits a lower air resistance with a current at right angles than with a current from the opposite side.

Known vertical rotors should be of simple construction and should be capable of being manufactured at low cost. At the same time their efficiency should be high enough for them to be used to generate wind power economically. To this end, the rotor of the generic type is improved such that the rotor arms consist of one or a plurality of loops in vertical planes with an aerodynamic profile, where the profile shape is maintained essentially uniform over the entire length of the loop.

3 Claims, 24 Drawing Sheets

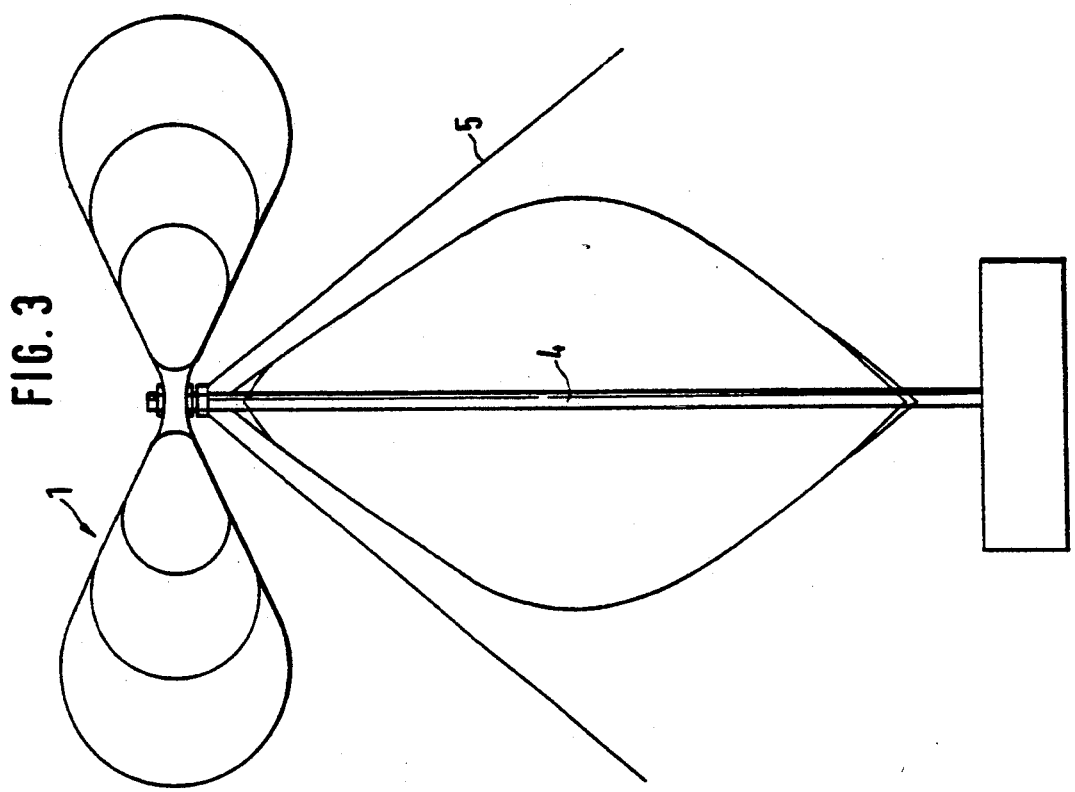
FIG. 3
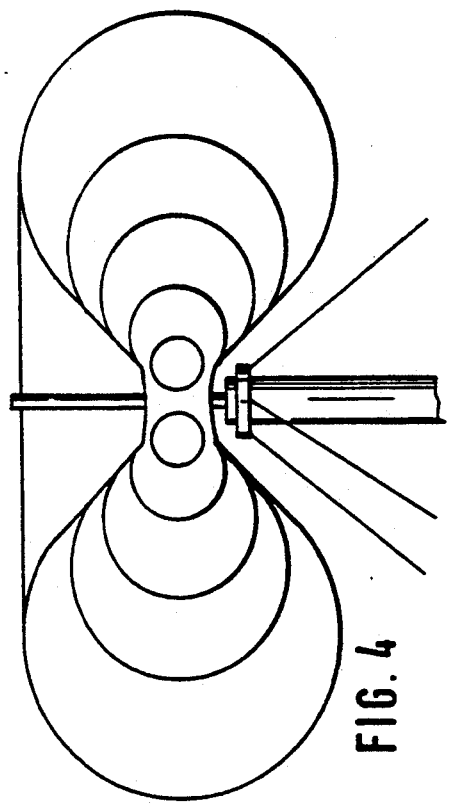
FIG. 4
FIG. 5
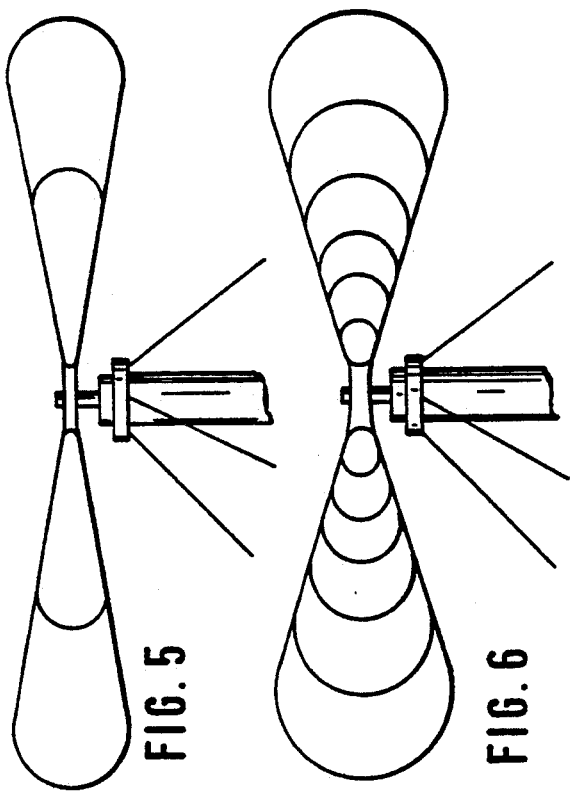
FIG. 6

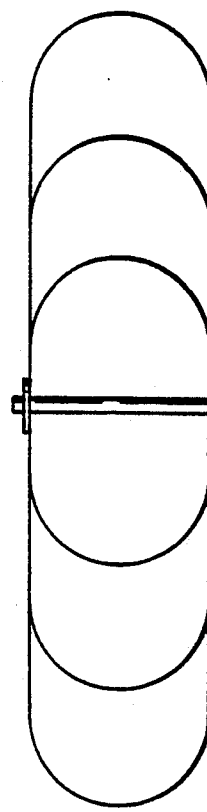
FIG. 7
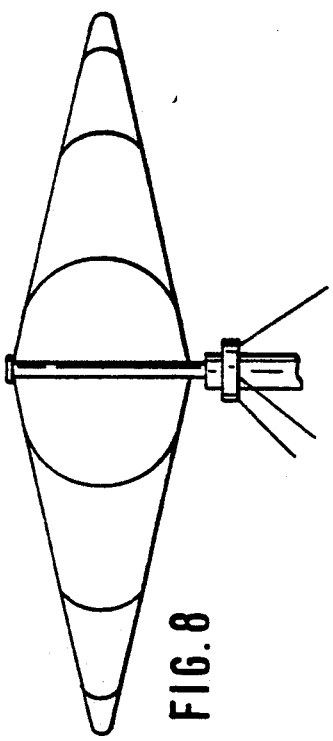
FIG. 8
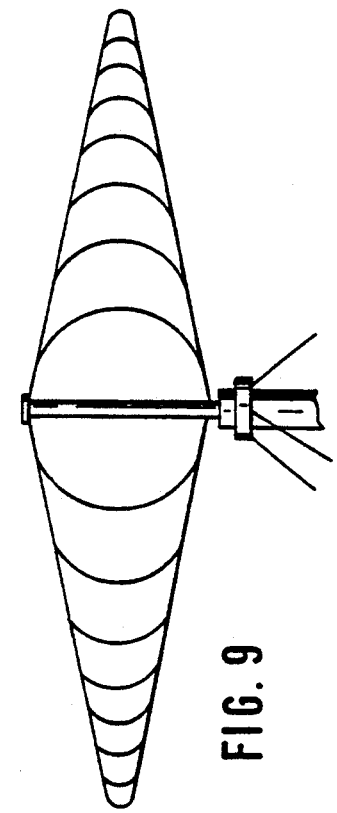
FIG. 9
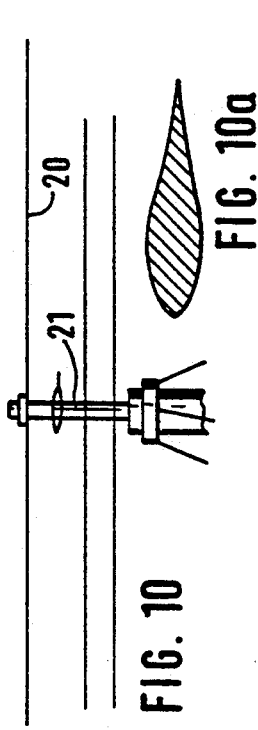
FIG. 10
FIG. 10a
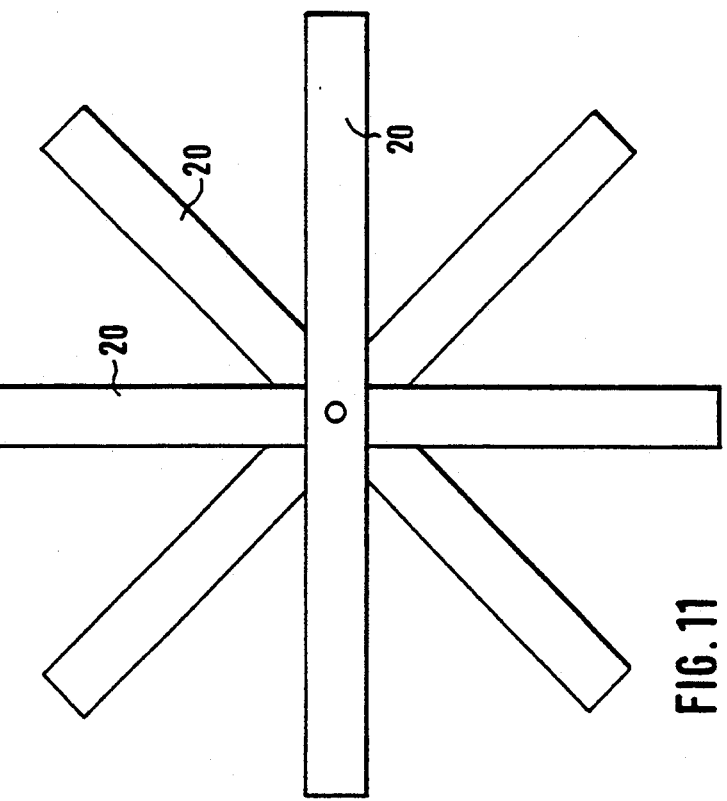
FIG. 11

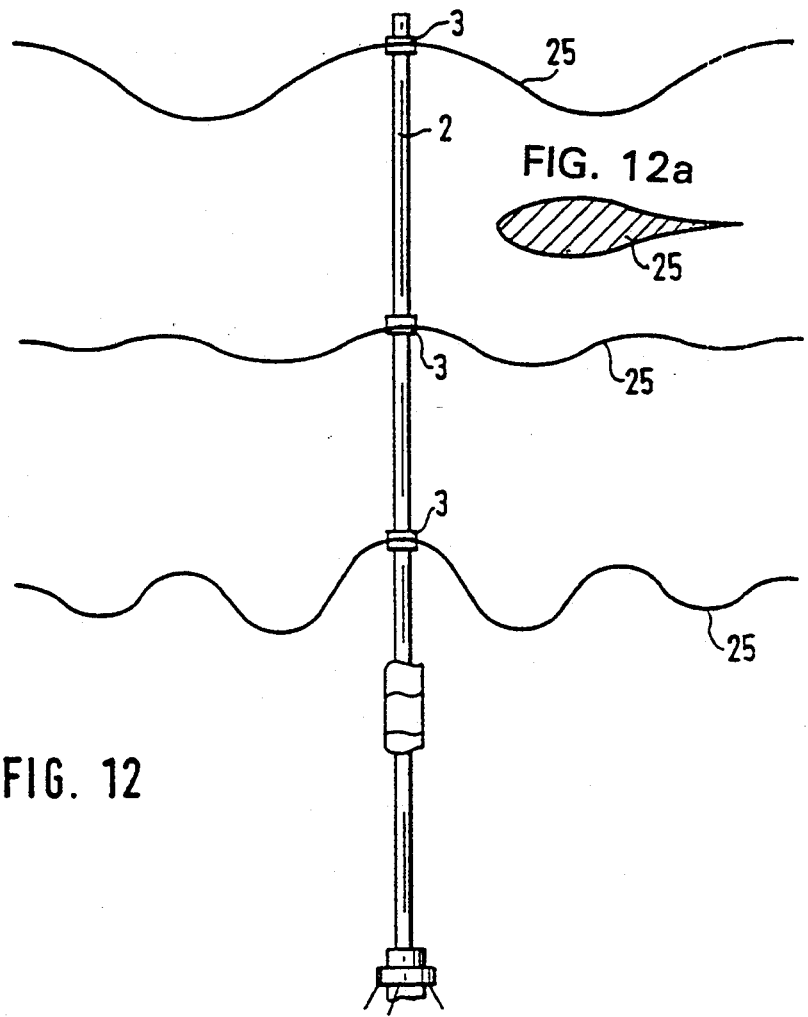
FIG. 12
FIG. 12a
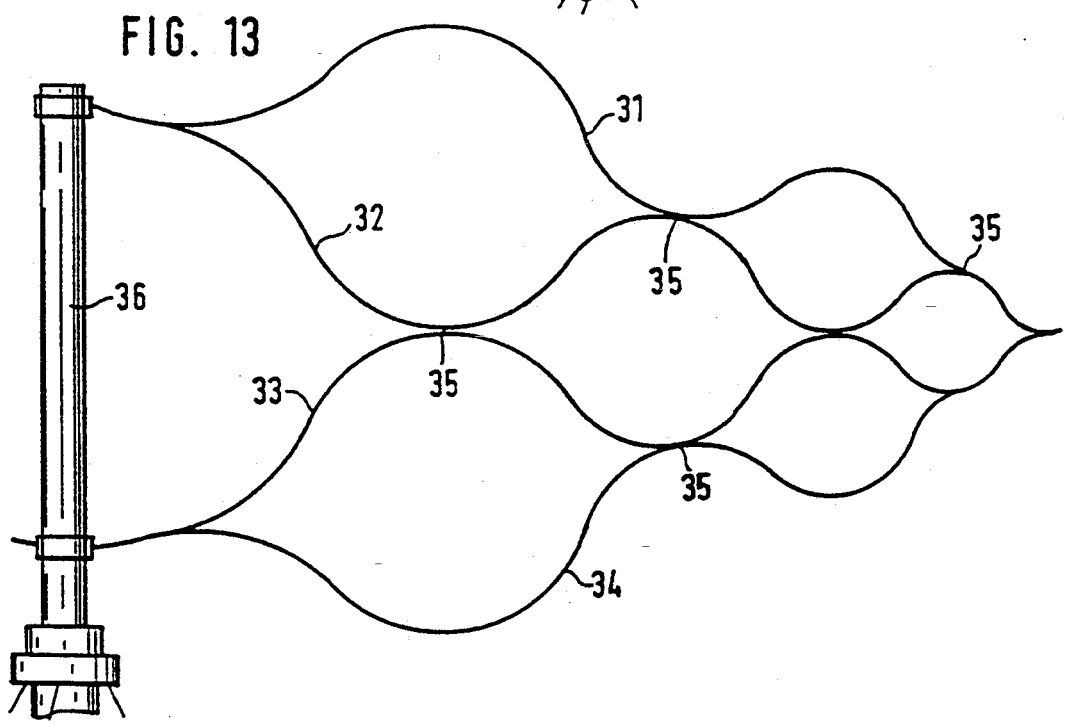
FIG. 13

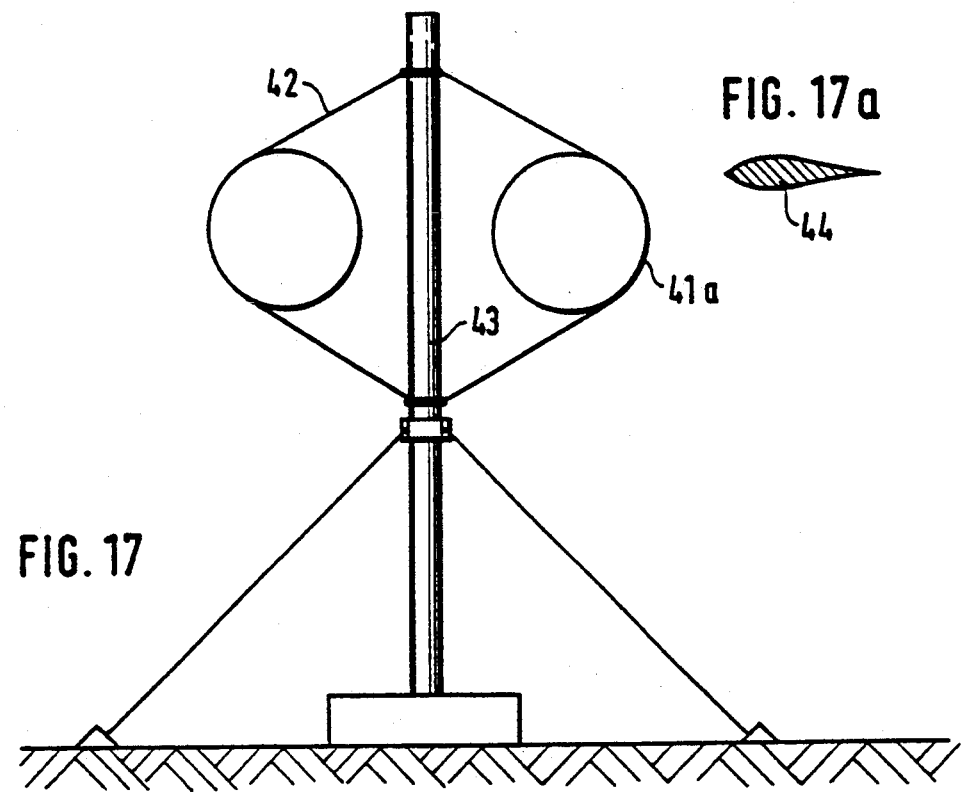

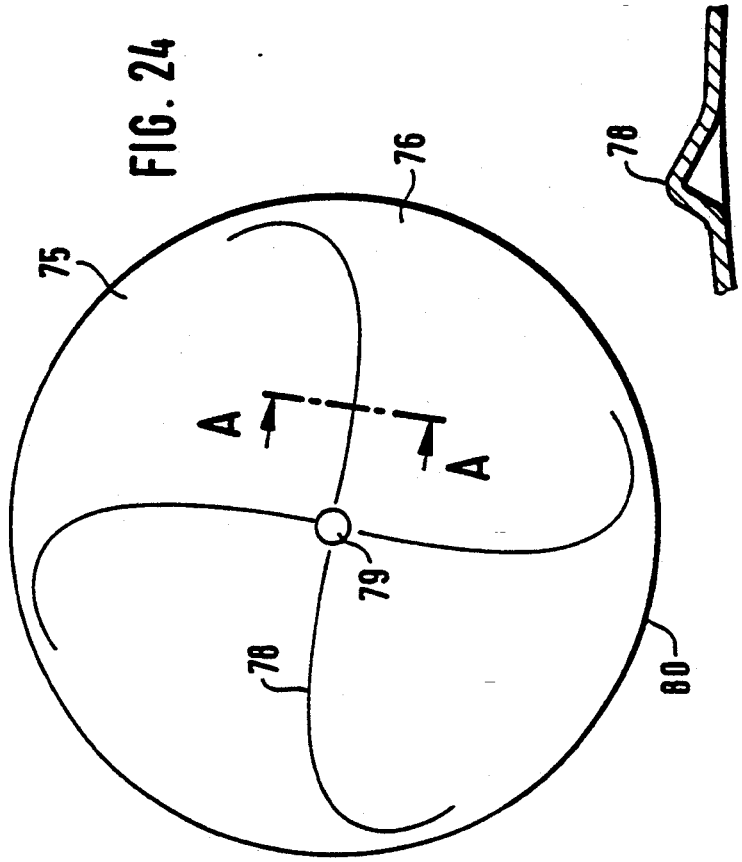
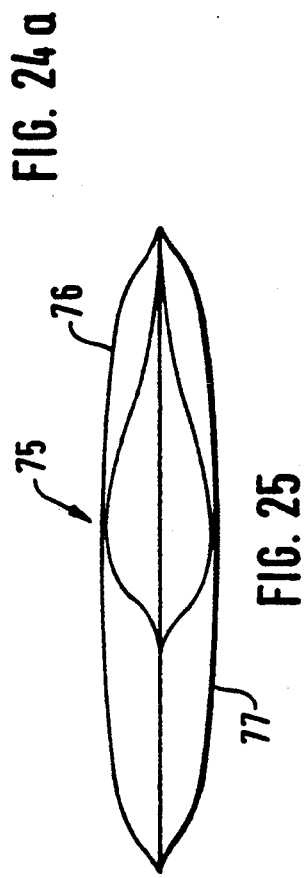
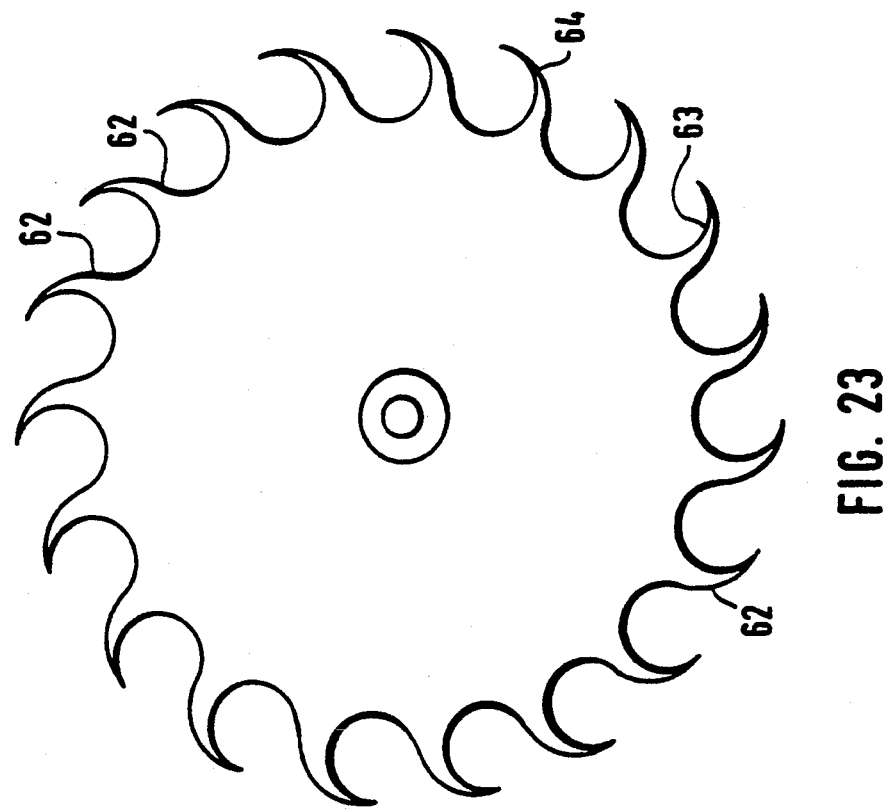

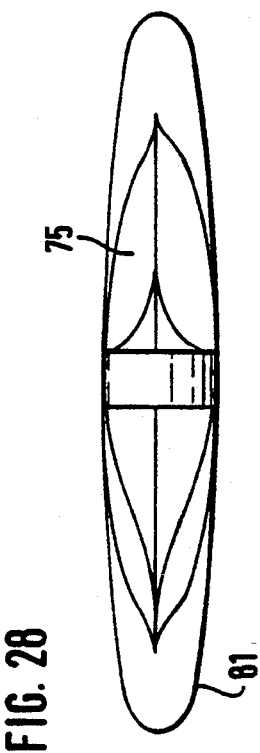
FIG. 28
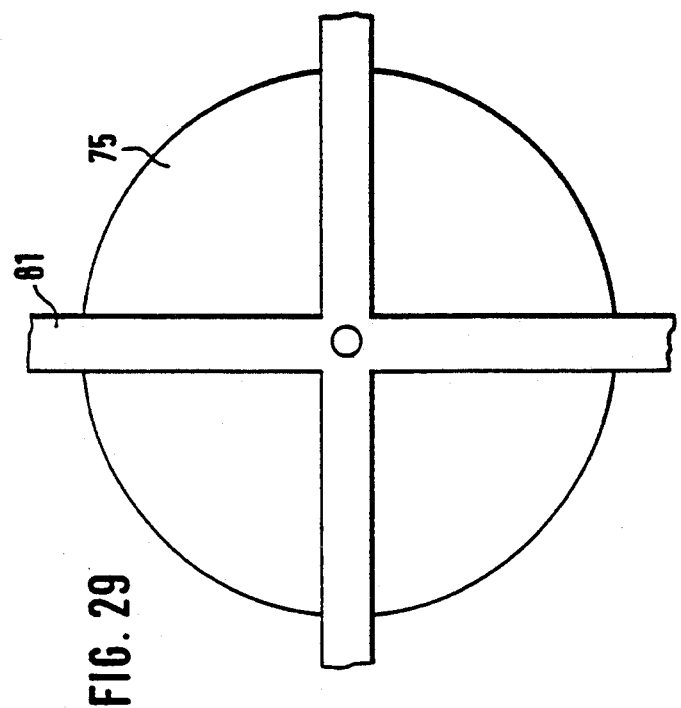
FIG. 29
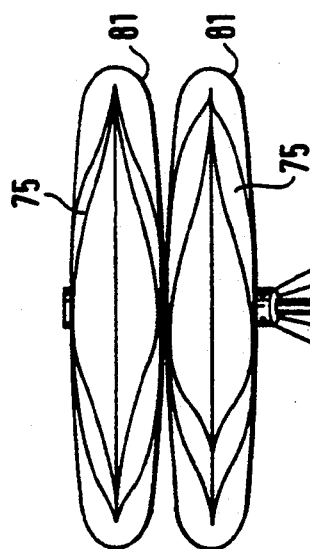
FIG. 27a

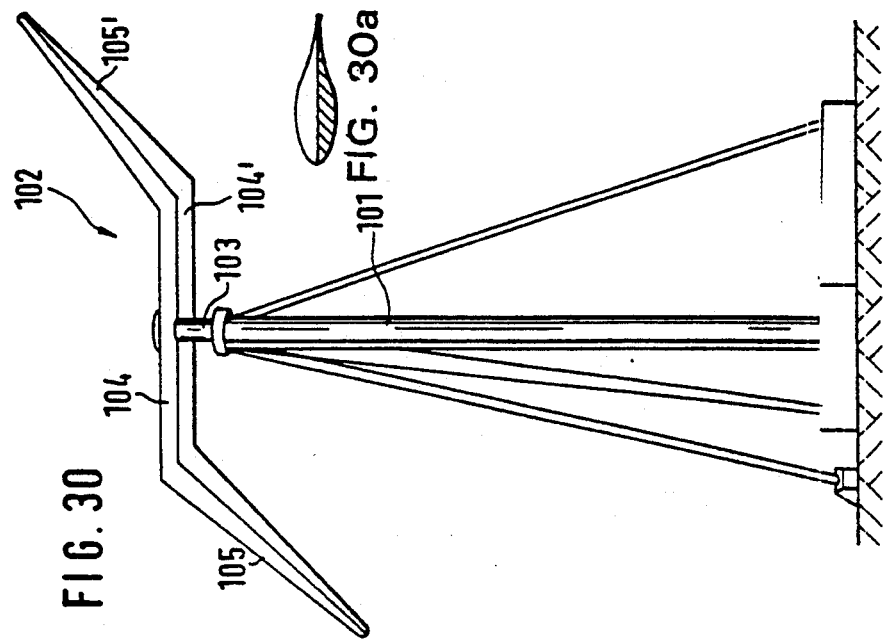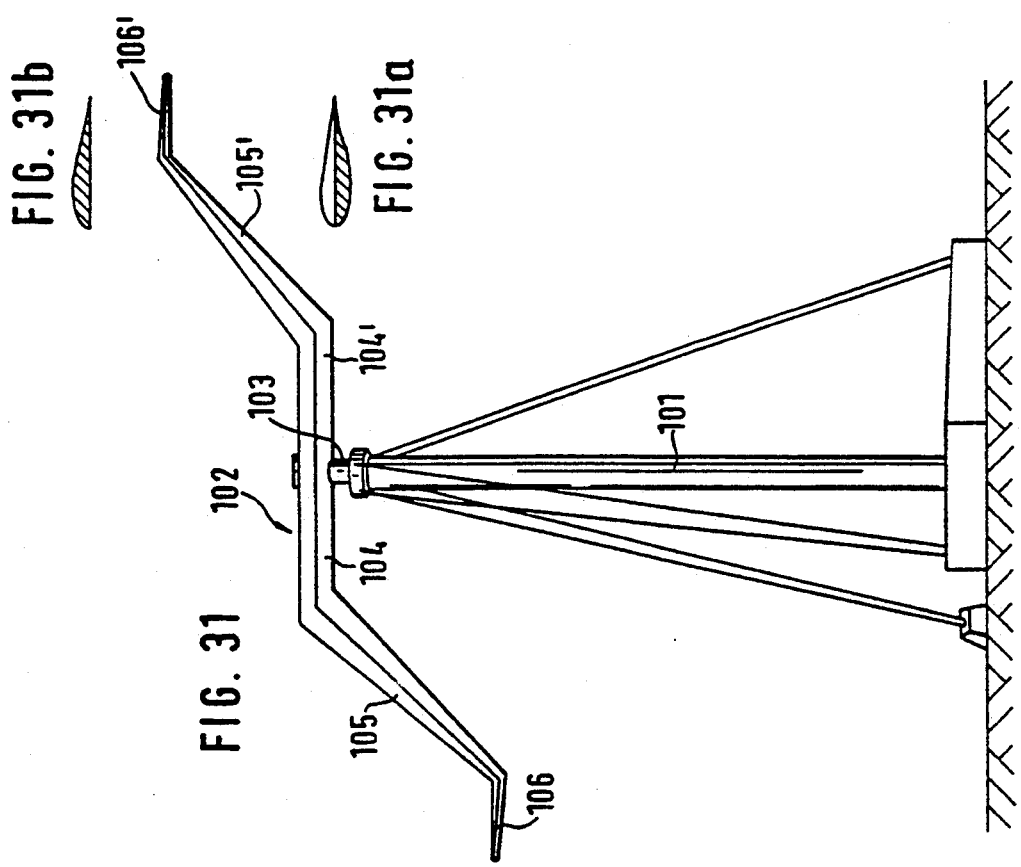

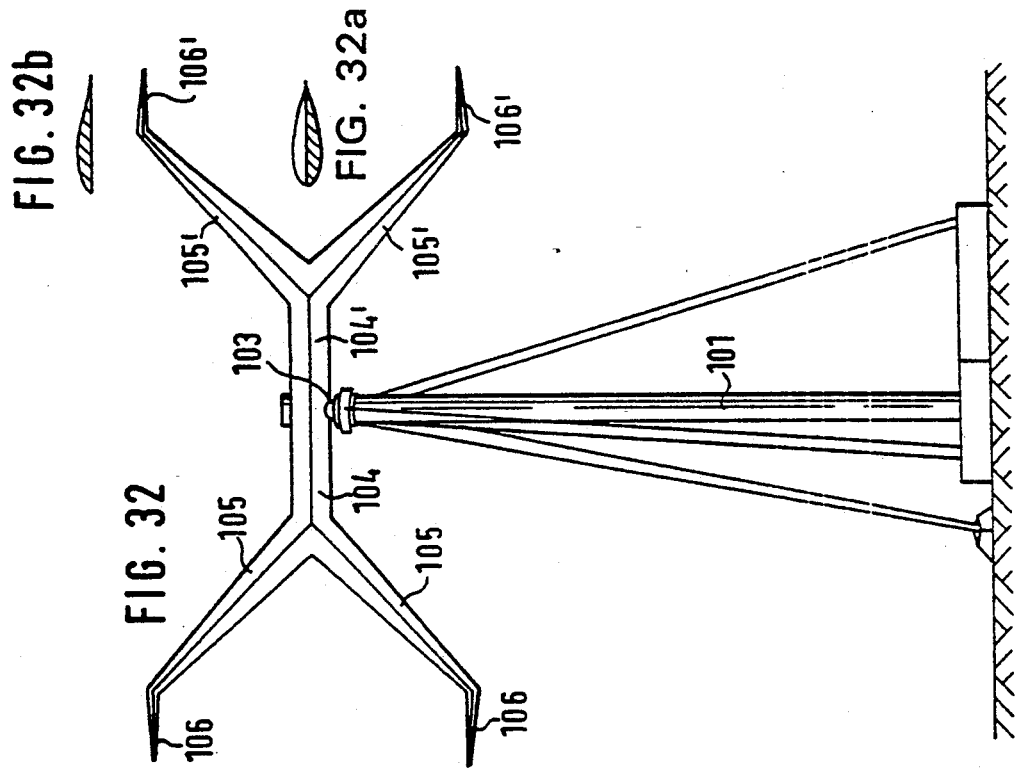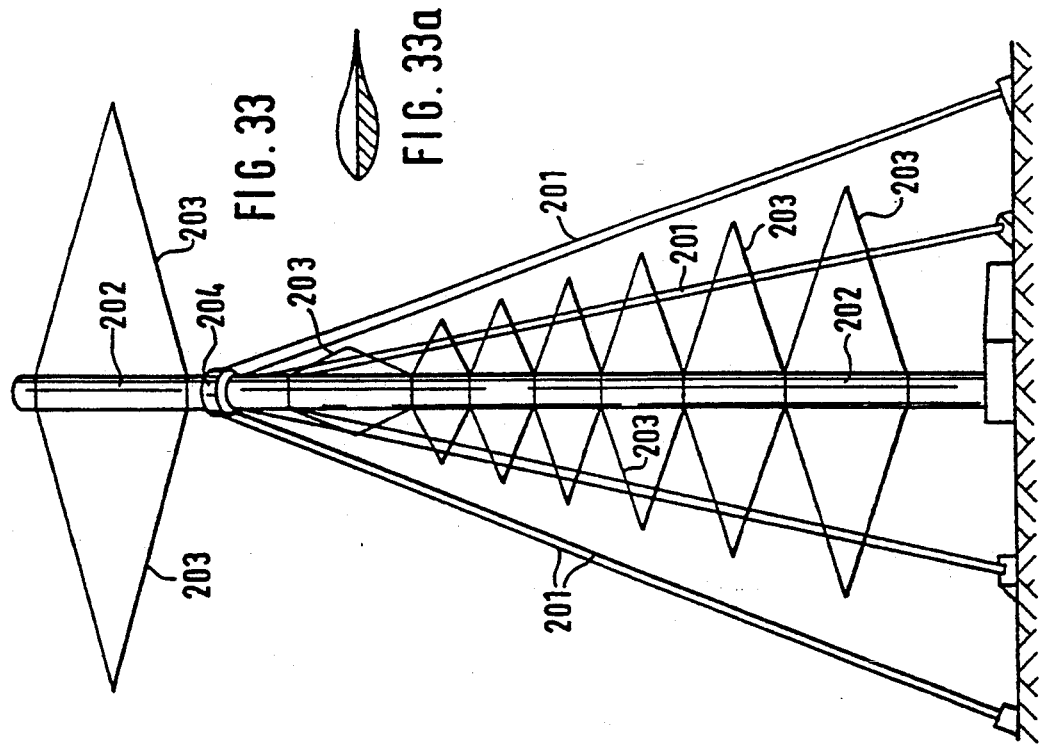

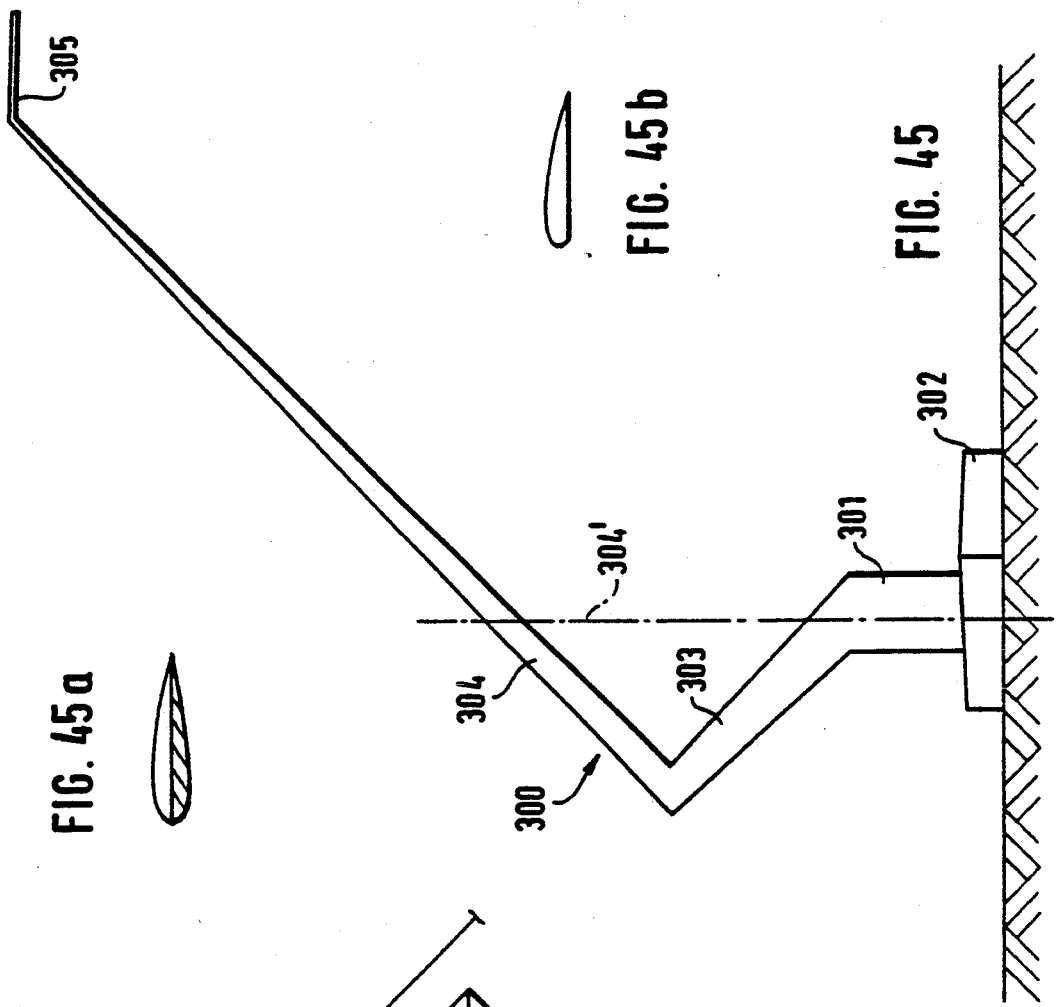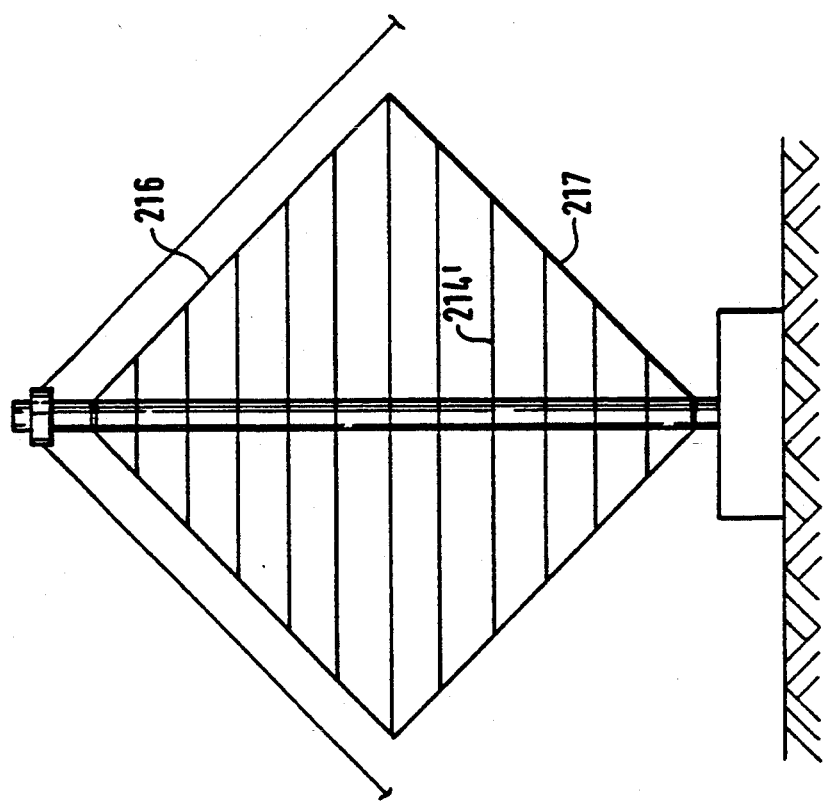

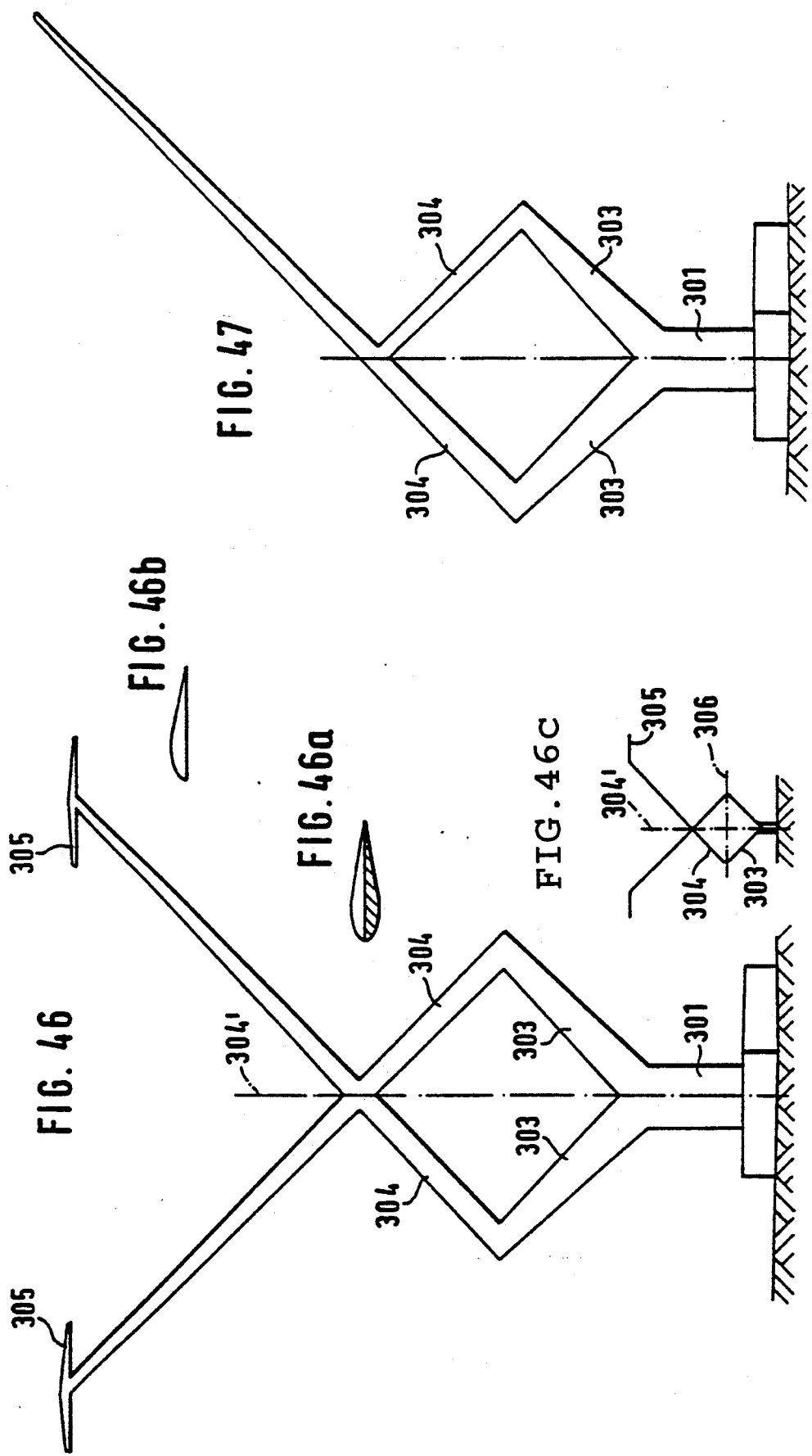

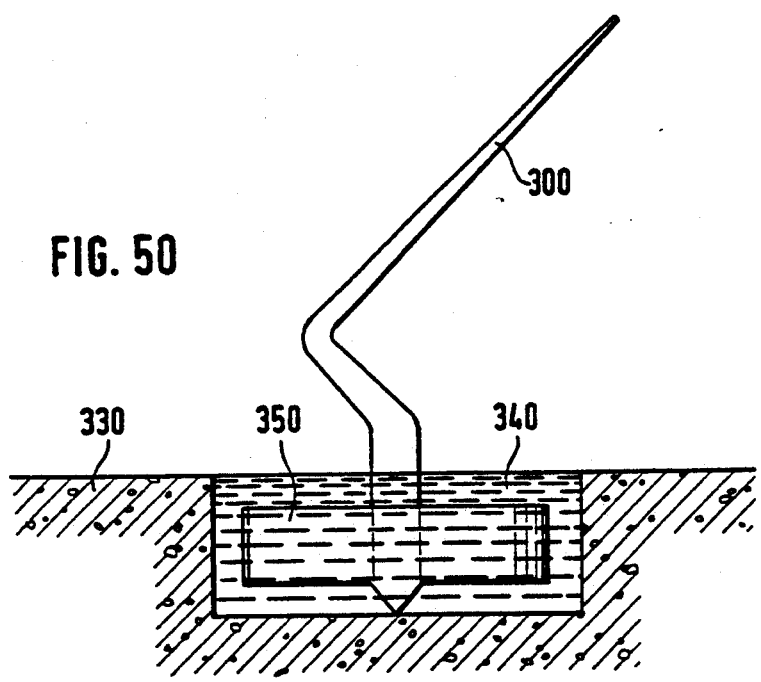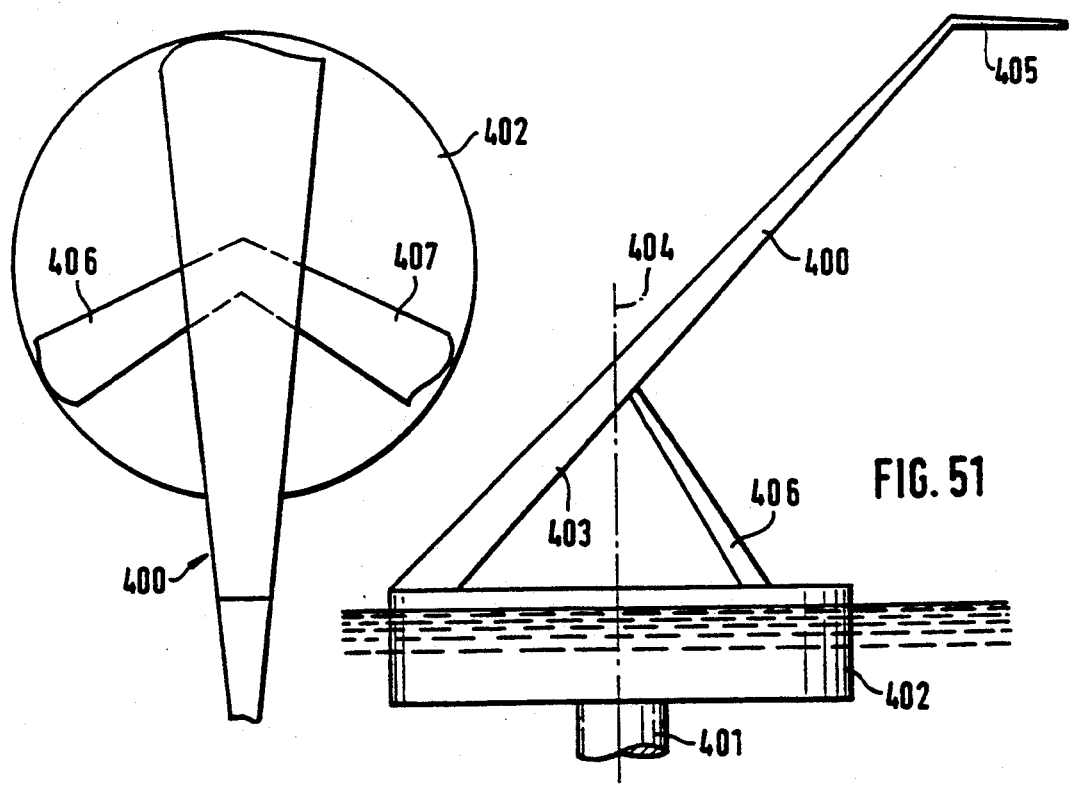

WIND-POWERED ROTOR

FIELD OF THE INVENTION

The present invention relates to a rotor driven by wind power with a vertical rotating axis and radial arms distributed at uniform angular intervals over its periphery which bear bodies with an aerodynamic profile such that one side of the profile exhibits a lower air resistance with a current at right angles than with a current from the opposite side.

BACKGROUND OF THE INVENTION

With current attempts at using wind energy for power generation, the method used commonly at present is to provide rotors with a horizontal rotating axis with radial rotor arms which work according to the principle of a windmill or propeller. The disadvantages of these rotors lie in the high level of noise generated and the required large investment arising from the necessity to provide high towers to install the rotors. In addition, these wind rotors which are known in the art require electrical generating equipment or similar to be mounted at the top of the tower unless costly transmissions are provided.

A further disadvantage of wind rotors with a horizontal rotational axis is that they can only work if the wind current approaches them at right angles. This means that the rotors must always be turned into the wind by special equipment.

Furthermore, the profile of the rotors known in the art is difficult and time-consuming to achieve with the result that they can generally only be manufactured at high cost.

Rotors of the type mentioned in the introduction are known, for example, as Darrieus rotors. These rotors consist of approximately hyperbolically curved rotor blades attached to a vertical rotating axis. By their very nature, however, these rotors are not self-starting. This means that they must be started by a servomotor. Moreover, useful power is only generated at wind speeds above 5 m/s if Darrieus rotors are used.

Another vertical rotor known in the art is the so-called Savonius rotor. This, however, has a very large area exposed to the wind, as a result of which it is at great risk from storms. For this reason it is generally used on a small scale as a ventilator for the inside of enclosed vehicles where it is roof-mounted.

Rotors of the type mentioned in the introduction are also known in the art for measuring wind strengths. The generic aerodynamic profile for these is formed by open semi-spherical dishes. These rotors too offer a large surface area to the wind with the result that, when scaled up, they are unsuitable for energy generation.

A wind collector blade for a horizontal turbine rotating about a vertical axis was described in German Patent 3 517 752 C 2. This wind collector blade consists of two wing profiles which were positioned adjacent to each other at a given radial spacing, connected by arms and which encompassed a through-flow duct. The two wing profiles with their outer face contours are formed as parts of the outer face contour of a thick, self-starting wing profile, and the wing profiles with their straight, parallel or approximately parallel inner flanks delimit the through-flow duct mentioned above. Although this already known vertical rotor, in contrast to the Darrieus rotor, permits self-starting even at relatively low wind speeds, its rotation is unnecessarily hindered by the through-flow duct formed between the two wing profiles. In addition, the design of this rotor is very complicated because of the complex flow through and around it, and the manufacture of the rotor blades, particularly the relative location of the wing profiles to each other, is very demanding.

A generic wind turbine tower is known in the art from U.S. Pat. No. 4,430,044 where horizontal rotor arm sections and vertical rotor arm sections located at right angles to these at their ends are provided. In the case of this already known configuration of the rotor blades it is necessary, particularly for self-starting by the rotor, to design the rotor blade sections such that their alignment relative to the wind is adjustable. To this end, an elaborate control device is provided specially in accordance with this known state of the art. A means of controlling the angle of incidence of the rotor blades during operation is also required in order to be able to operate this known vertical turbine, and thus its own control system must be provided. Such vertical rotors are consequently unsuitable for self-assembly or for use in developing countries since in this case what are particularly required are easily constructed rotors without complicated control systems.

German Patent 3 529 474 A 1 describes a collapsible vertical windmill with four main sails in a rhombic configuration relative to each other. To assist the operation of this vertical windmill, auxiliary sails are provided in addition to the main sails. Furthermore, the individual sail arms are mounted on shafts which are connected with each other at the corners of the rotor via articulated joints. These articulated joints represent weaknesses in the overall rotor which have an adverse effect on the stability of the vertical windmill as a whole. Moreover, this vertical windmill too requires an elaborate control system.

A vertical wind rotor is known from U.S. Pat. No. 4,561,826 whose rotor arms can pivot during rotation about the horizontal axis such that the rotor arms can be moved from an alignment diagonal to the vertical axis as far as the horizontal. This requires a complex construction for the rotor as a whole or the use of, on the one hand, flexible and resilient materials in the manufacturing process and, on the other, materials in the manufacture of the rotor arms which can withstand constant stresses.

SUMMARY OF THE INVENTION

It is the object of the invention to create a rotor of simple construction of the type described in the introduction which can be manufactured at low cost and whose efficiency is high enough for it to be used to generate wind power economically while avoiding the disadvantages mentioned above.

This object is achieved in the invention with a rotor of the generic type in that the rotor arms consist of one or a plurality of loops in vertical planes with aerodynamic profiles. If the rotor arm consists of a single loop it is already possible to achieve a substantial energy output. This can be increased considerably by configuring a plurality of loops to be nested inside each other such that the surface area of the rotors exposed to the wind is increased. Furthermore, the nesting of a plurality of loops increases the stability of the rotor arms. The rotor arms are ideally located symmetrical to a radial plane through the hub. A section through this plane shows the aerodynamic design of the profiles of the rotor arms, i.e. teardrop-shaped or streamlined.

The loops consist advantageously of arms diverging from the region of the hub and whose radial outer zones are connected with each other by arc-shaped profile strips. This design results not only in a favourable torque being created out of the difference in the moments of opposed rotor arms but also a supplementary drive force is produced by diagonal wind flow against the profiles so that even in these areas moments transmitted to the rotor shaft by the rotor arms are produced in which the rotor arms are diagonal to the direction of wind flow.

Several nested profile loops advantageously share the same arms which are connected with each other at varying radial spacings from the rotating axis by arc-shaped profile strips.

The arms which are at an angle relative to each other are ideally essentially in a straight line. Arms of the rotor arms opposed to each other by 180° can resemble a flat, prone X.

A second embodiment of the rotor according to the invention provides for the rotor arms to be curved in planes vertically transecting the rotating axis. The curve of the rotor arms ideally approximately resembles a sine wave. The rotor arms can be attached to the rotating axis of the hub connected to this in the region of convex, upward-turning crowns.

Ideally the amplitude of the sine-wave curve of the rotor arms radially outwards diminishes. The curve is therefore approximately the shape of a damped sine oscillation. The advantage of this design is that the surface area exposed to the wind flow is increased in that the arriving wind strikes sections of the rotor which are not in the lee of preceding sections. In addition, this design ensures that there is a supplementary torque when the rotor is diagonal to the wind as a result of the diagonal attack on the profiles.

Advantageously, a plurality of arms are mounted on a shaft at vertical spacings.

A further embodiment of the invention provides for the arms to consist of straight or essentially straight radial profile strips or blades. A plurality of such rotors formed by such straight profile strips or blades can be mounted on a vertical shaft at a vertical spacing from each other. Advantageously, each rotor consists simply of two arms opposed at 180° where the arms of consecutive rotors are configured such that they are offset by a given angle relative to each other in a peripheral direction.

The axial distance between the rotor blades corresponds preferably to approximately double their width.

In a further version of the invention the loop-shaped arms, rotor blades or profile strips have a teardrop- or pear-shaped profile with flattened profile ends. Ideally the profile is symmetrical along its longitudinal centre line. The profile can be, for example, in the shape of an aerofoil but symmetrical along its longitudinal centre line because it is not intended that the profile should produce any uplift. A feature of the invention provides for the region of the profile between its greatest diameter and its pointed trailing tip to have a concave curve. This concave curve is particularly advantageous in the case of diagonal flow and the propulsive thrust generated in this way. This design is also favourable when the rotor blades are turned at 180° to the wind direction where the wind approaches the rotor blades from the rear. Under such wind flow conditions a particularly large moment is transmitted by the rotor arms to the rotor shaft because the drag coefficient is considerably increased.

The rotors in accordance with the invention also offer the advantage that they do not have to be switched off even in a strong wind because they stabilise their torque themselves. Only a small stress is therefore transmitted to the substructure on which the rotors are mounted.

A further solution to the object defined above consists in the generically designed rotor arms comprising an even number of essentially identical slat-like blades with a sine-wave curved shape at right angles to the longitudinal axis; adjacent blades are joined together in the region of their crowns. In principle, the rotors can have rotor blades with a sine-wave shape. However, they only have limited stability with the result that they can be deformed when exposed to the effects of centrifugal forces. The compound configuration of the sine-wave-shaped rotor blades in accordance with the invention results in the rotor arms being stronger and more stable.

The blades of the arms are advantageously curved in the shape of a damped sine-wave. They thus exhibit diminishing amplitudes and periods.

The rotor blades can also be curved in the form of a zig-zag line with obtuse, rounded angles.

Another embodiment provides for the arms to consist of profiles with a circular curvature which are attached to the rotor hub by two essentially straight profiles connected approximately tangentially to the profiles with a circular curvature.

Another embodiment provides for the arms to consist of profiles angled, preferably acutely angled, relative to each other, which profiles are connected to each other in the region of their tips and to the rotor hub in the region of their inner ends.

The cross-sections of these profiles are ideally like thin teardrops with ends tapering to a point.

A plurality of rotors can be located in vertical layers on a shaft.

A further rotor driven by wind power with a vertical rotating axis is characterised according to the invention in that the rotor is drum-shaped and provided with an external sleeve-shaped ring which consists of approximately semi-circular to three-quarter-circular shells, one lateral edge of each of which is connected approximately tangentially with the sleeve of the preceding shell. A rotor designed in this manner has concave shells on one side which offer greater resistance to the wind than the convex shells on the opposite side. These rotors can also be located in a number of vertical layers. It is possible to provide a braced mast forming a central axis which is fitted with layers of rotors along its entire length.

The individual rotors can also be interconnected with the result that one single extended rotor is formed.

The drum-shaped rotor can also power a vertical quill, and a rotor with a substantially greater diameter consisting of two arms located on a second shaft mounted in the quill and rotating independently of it can be provided above the drum-shaped rotor where the rotor arms of this rotor are curved in vertical planes transecting the rotational axis. In this embodiment the drum-shaped rotor can, for example, drive a first generator while the curved second rotor drives a second generator. Additionally, the drum-shaped rotor can also be used as a drive by means of a transmission belt simply mounted around it.

A further embodiment provides for the rotor to be approximately spherical or ellipsoidal, the sleeve sectors of the rotor to be curved in an approximate sickle shape, to have an S-shaped cross-section with an approximately semi-circular to three-quarter-circular arc and an approximately one-quarter-circular opposed arc and to be connected along their longitudinal edges, and for the sectors to be attached to the rotor hub in the region of their tapered ends.

This rotor can be filled with a gas which is lighter than air with the result that a floating balloon is formed; the rotor axis though is connected by cables to ground-anchored bases. The hovering rotor can be allowed to rise to altitudes with a high wind current speed. If the wind becomes too strong the balloon-like rotor can be reeled in via the cables and brought to a wind-protected position.

It is also possible for two spherical rotors to be located on a common shaft such that they are counter-rotating. In this way additional stabilisation of the vertical rotor is achieved.

A further embodiment provides for the rotor to be discus-shaped such that beads are provided on its dish-shaped upper and lower halves running at uniform angular intervals from the shaft to the edge which have an approximately semi-teardrop-shaped profile. The beads can also run in an arc from the shaft region to the outer edge.

These discus-shaped rotors can also be configured in a plurality of layers or produced in a balloon-type version.

The rotor can be enveloped in loop-shaped rotor arms distributed at uniform angular intervals over its periphery where one of the profile sides of each has a lower air resistance with wind flow at right angles than with wind flow from the opposite side. The length of the loop-shaped rotor arms projecting radially from the vertical rotating axis is greater than the radius of the discus-shaped rotor. Four loop-shaped rotors can preferably project radially from the vertical rotating axis, with a right angle being included between each of them.

A further solution to the object defined above consists in one upward-facing and one downward-facing rotor arm, which lie essentially in a vertical plane, being attached to the rotor hub. The fewer rotor blades a wind-powered rotor has, the faster it is at the same angular velocity. This is attributable to the fact that an accumulation forms before the rotor which increases with an increasing number of rotor blades. A single-blade rotor is not only faster but also has a better energy output. Single-blade rotor blades rotating about a horizontal axis have already been constructed but they require an appropriate counterweight to produce a balanced rotor. A single-sail rotor of this kind, for example, is known by the name of "Monopeteros". Despite balancing, single-blade rotors have the disadvantage that ice can form on the blade, thereby creating an imbalance which can result in damage to or destruction of the rotor.

The rotor according to the invention, however, shares the fundamental characteristics of a single-blade rotor with double the effectiveness and energy output because, although two rotor arms or blades are present, they face in opposite directions so that when the rotor turns they rotate in separate spaces. Since, therefore, the rotor arms according to the invention rotate in separate spaces they have no influence on each other and thus have the effect of two single-wing rotor blades. Since the two rotor arms are configured such that they are offset by 180° relative to each other about a common horizontal axis, but are otherwise identical in design, the rotor is statically balanced. Naturally, the profiles of the rotor arms are transposed through 180° relative to each other with reference to their perpendicular transverse centre plane.

Since the rotor according to the invention can be regarded as a doubling of a single-wing rotor it shares the fast-running characteristics of single-wing rotors with a high energy output. The upward-facing and downward-facing rotor arms are advantageously attached to the ends of horizontally configured profile sections. These radial profile sections enlarge the lever arms on which the developed rotor arms act.

The rotor arms advantageously form an acute angle with the rotating axis component about which they rotate. The rotor arms can also run parallel to the transverse axis or form an obtuse angle with it. Furthermore, the rotor arms can also be curved at will. Ideally, the cross-sections of the rotor arms and the profile sections are in the form of thin teardrops tapering to a point.

Soley upward-facing or solely downward-facing or both upward-facing and downward-facing rotor arms can be attached to the rotor hub or the ends of the horizontally configured profile sections. With this design, however, the effects of single-wing rotors are conceded.

Horizontally configured profile sections can be fitted to the ends of each of the upward-facing and downward-facing rotor arms, the profiles of which are formed such that a component of force acting radially on the upward-facing or downward-facing rotor arms, as appropriate, is equalised. To this end, the profile section is advantageously aerofoil-shaped.

A further solution to the object consists in the rotor arms comprising profiles in the shape of stirrups positioned relative to each other whose arms are attached to the rotor shaft or the rotor axis. In principle, the stirrups can have any desired shape. Stirrups with symmetrically configured geometric shapes, however, are advantageous. These stirrups consist of slats with the necessary aerodynamic profile cross-sections.

The profiles are advantageously configured in the form of isosceles triangles relative to each other.

The profiles can also be configured in a rectangular shape relative to each other.

A further embodiment provides for the profiles to be configured in the form of stirrups with parallel arms which are connected together in the shape of hairpins at their radial outer ends by means of curved stirrup components.

In order to exploit the wind on a greater surface area, a plurality of rotors are advantageously configured in vertical layers on a common shaft or hub.

The rotors configured in a plurality of vertical layers are advantageously offset by 180° each time in a common vertical plane.

Another embodiment provides for the length of the rotors configured in vertical layers to increase from top to bottom.

The radial outer ends of the rotors can be connected together by profiled slats.

Another embodiment provides for a plurality of rotors, which are configured horizontally and parallel to each other with a given spacing, to be connected together by means of vertically or diagonally configured profiles. The profiles in turn lie ideally in a common plane. The profiles can also be located on the rotor shaft or the hub in a star configuration so that they are always at angles of less than 180° relative to each other. The boundary profiles can also be in the shape of isosceles triangles.

These above-mentioned rotor profiles can be simply assembled out of prefabricated components. This is, for example, also easily possible for the hairpin-shaped curved stirrup sections since these rotor arm components can be prefabricated and easily connected with the straight rotor components as prefabricated components during the final assembly of the rotor.

A further solution to the object defined above consists in at least one rotor arm designed in accordance with the generic type being formed such that a rotor arm component begins at the rotating axis and faces away form the centre line of rotation, that a further rotor arm component facing diagonally towards the centre line of rotation is connected with this rotor arm component, and that this further rotor arm component projects beyond the centre line where the profile is offset by 180° beyond the centre line.

Such a rotor can be formed as an integral part of the vertical rotational axis.

A horizontally configured stabiliser wing can follow the rotor arm section projecting beyond the centre line of rotation of the rotor, the purpose of which is to balance out the tendency of the rotor arm to move to the horizontal as a result of centrifugal force.

Further rotor arm components can also advantageously be provided such that the rotor arm components as a whole assume the shape of a rectangle standing on one corner; at least one rotor arm component projects above the tip of the rectangle which lies above the centre line of rotation.

It is particularly possible with the latter-mentioned embodiment for a supplementary stabilising flat rotor to be provided which is horizontally aligned and connected to the rotor described previously such that it transects the two lateral corner points of the rotor arm rectangle which is standing on one of its corners.

All the preceding vertical rotors in accordance with the invention which have been described can be located both on land or on a floating island or on a ship. It is advantageous to locate vertical wind rotors at sea because the oncoming wind generally attains higher wind speeds as a result of the lack of obstacles on the water surface.

In an embodiment where the rotor is firmly attached to the rotating shaft, the shaft can be connected to a gas-filled buoyancy device rotating in the water. The buoyancy device can advantageously bear brush-like continuations on its exterior which extend into the water reservoir. When the rotor turns there is an automatic braking effect and, as a result of friction, the water is noticeably heated. Consequently, in addition to the electrical energy generated via the generator, heat energy can also be provided by the vertical rotor, as a result of which the wind energy conversion efficiency is improved.

A further solution to the object defined above consists in a disc being located on the rotating shaft, in a first rotor arm extending at a diagonal incline from the outer edge of the disc to the centre line of rotation where the profile is offset on the far side of the centre line by 180°, and in rotor arms extending from other points on the edge of the disc with an incline towards the centre line of rotation which act upon the first rotor arm.

The disc can also be designed as a buoyancy device which enables the vertical rotor to float on the surface of the sea. At the upper end of the projecting rotor arm an essentially horizontally configured stabiliser wing can additionally be provided.

BRIEF DESCRIPTION OF THE DRAWINGS

FIG. 2a is a cross-section taken on line I—I of FIG. 2.

FIG. 3 is a schematic view of a rotor having three nested loops.

FIG. 4 is a schematic view of a rotor having four nested loops.

FIG. 5 is a schematic view of another rotor having two nested loops.

FIG. 6 is a schematic view of a rotor having six nested loops.

FIG. 7 is a schematic view of a rotor having loop-shaped rotor blades with arms parallel to each other.

FIG. 8 is a rotor having converging rotor blade arms.

FIG. 9 is a schematic view of another rotor having converging rotor arms.

FIG. 10 is a schematic view of a rotor having straight rotor blades.

FIG. 10a is a cross-sectional view of the profile of a rotor arm of FIG. 10.

FIG. 11 is a schematic view of a rotor having straight rotor blades.

FIG. 12 is a schematic view of a rotor having sign-wave-shaped arms.

FIG. 12a is a cross-section through the rotor blades of FIG. 12.

FIG. 13 is a schematic view of another rotor having sign-wave-shaped rotor arms.

FIG. 17 is a schematic view of a rotor having arms with circular profiles.

FIG. 17a is a cross-sectional view of a profile of a blade of the rotor of FIG. 17.

FIG. 18 is a schematic view of a rotor having arms with straight blades.

FIG. 23 is a cross-sectional view of a rotor of FIG. 22.

FIG. 24 is a cross-sectional view of a discus-shaped rotor.

FIG. 24a is a cross-sectional view of a bead 78 of FIG. 24.

FIG. 25 is a schematic view of another rotor having a discus-shaped disc.

FIG. 27a is a schematic view of a rotor having two discus-shaped disc rotors.

FIG. 28 is a schematic view of a rotor having four loop-shaped rotor arms.

FIG. 29 is a schematic view of another rotor having four loop-shaped rotor arms.

FIG. 30 is a schematic view of a rotor having two rotor arms.

FIG. 30a is a cross-sectional profile of a rotor arm of FIG. 30.

FIG. 31 is a schematic view of another rotor, fitted with supplementary stabilizer blades.

FIG. 31a is a cross-sectional view of a blade of FIG. 31.

FIG. 31b is a profile of a stabilizer blade 106, shown in FIG. 31.

FIG. 32 is a schematic view of a rotor having rotor blades attached to the shaft.

FIG. 32a is a cross-sectional view through a profile section 104.

FIG. 32b is a cross-sectional view through the stabilizer blades 106.

FIG. 33 is a schematic view of a rotor having a plurality of rotor arms configured in vertical layers in the form of triangular stirrups.

FIG. 33a is a cross-sectional profile of a rotor arm 203.

FIG. 44 is a schematic view of yet another rotor.

FIG. 45 is a schematic view of a vertical rotor having a single rotor arm 300.

FIG. 45a is a cross-section of a profile of the rotor arm.

FIG. 45b is a cross-sectional profile of the stabilizer wing shown in FIG. 45.

FIG. 46 is a schematic view of a rotor two single-arm rotors.

FIG. 46a is a cross-sectional profile of a rotor arm section 303 of FIG. 46.

FIG. 46b is a cross-sectional profile of a stabilizer wing FIG. 46 of FIG. 46.

FIG. 46c is a schematic view of a variation of the rotor of FIG. 46.

FIG. 47 is a schematic view of another rotor having a single rotor arm.

FIG. 50 is a schematic view of a rotor for mounting in a pit in the ground.

FIG. 51 is a schematic view of a wind-powered vertical rotor.

FIG. 52 is a schematic view of another wind-powered vertical rotor.

DETAILED DESCRIPTION OF THE PREFERRED EMBODIMENTS

Embodiments of the invention are described below in detail with reference to the accompanying drawings.

Figure 1:
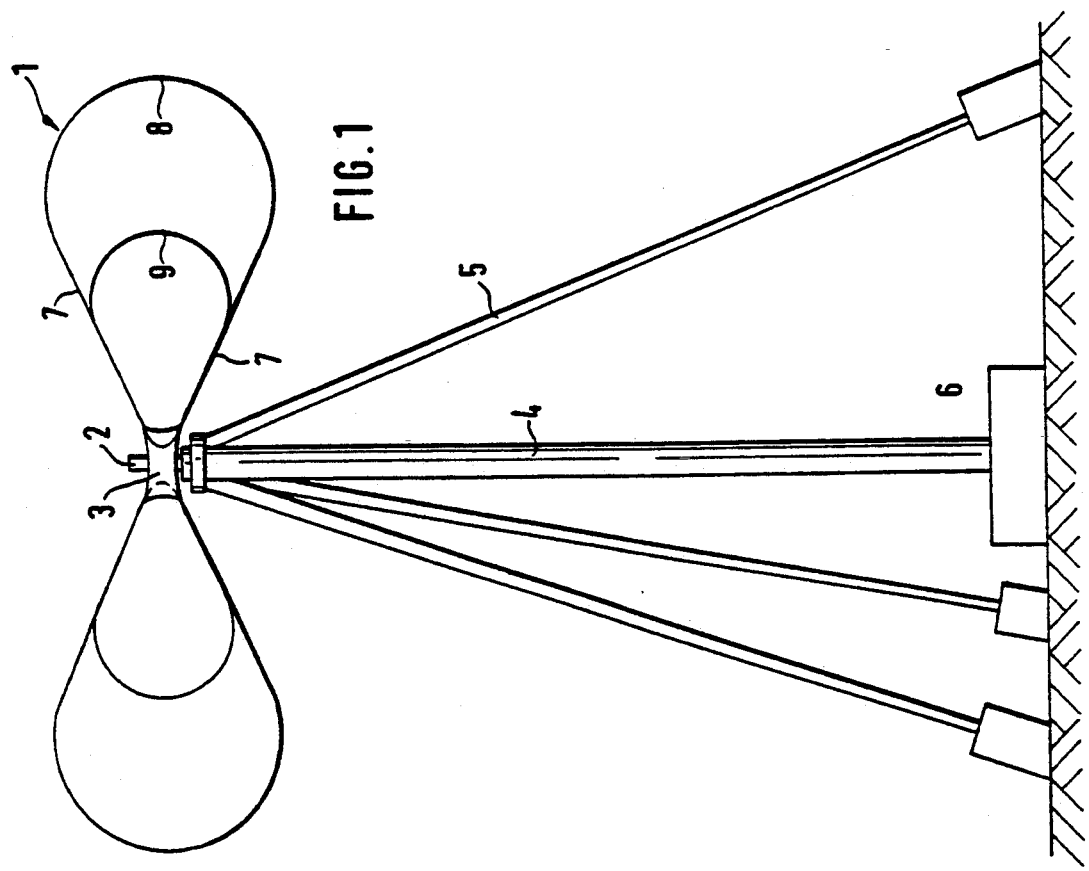
FIG. 1 is a schematic elevational view of a rotor having two rotor arms.

FIG. 1 shows a rotor, whose two rotor arms (1) are offset by 180° relative to each other and are connected to a vertical shaft (2) via a hub (3) which bears the rotor arms. The rotor shaft (2) is mounted in a vertical tower (4) which is braced in conventional fashion by means of struts or cables (5). A room (6) located on the ground can accommodate machinery. The height of the rotor mast (4) can be set at will and can be, for example, 40 to 50 m.

The diameter of the rotor can be selected as appropriate and can be, for example, 10 to 20 m or even more depending on the average wind conditions at the chosen site.

The rotor arms (1) consist of profile arms (7) configured at a given angle relative to each other whose outer end zones are connected together by means of an approximately circular profile section (8). A further loop is nested inside the thus formed loop in that an approximately circular profile section (9), whose radial distance from the rotor shaft is less, is connected to the arms (7). The circular profile sections (8) and (9) consist advantageously of prefabricated profiles which simply have to be attached to the profile arms during the final assembly process.

Figure 2:
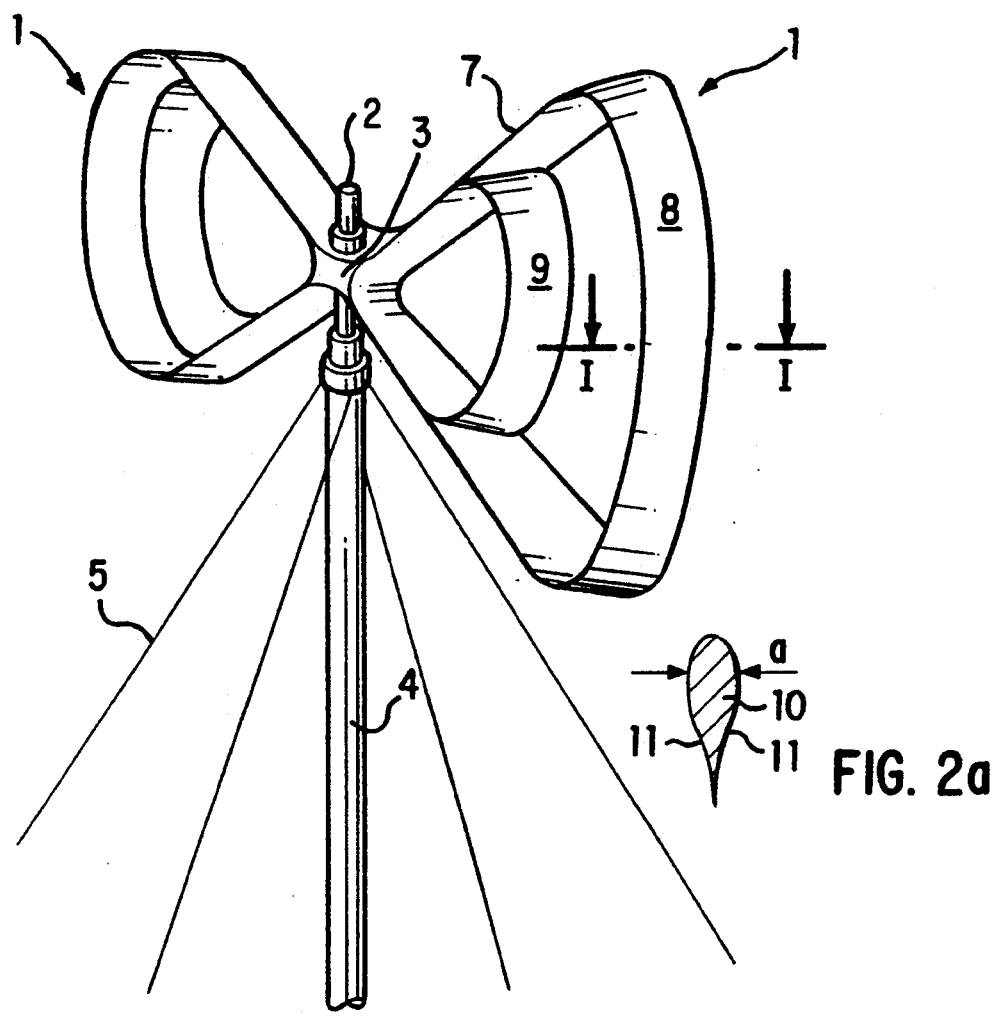
FIG. 2 is a schematic perspective view of a rotor of FIG. 1.

As can be seen from FIG. 2, the rotor arms (1) are configured in a plane running vertically through the rotating axis.

The rotor arms consist of profile strips whose cross-section is as illustrated in FIG. 2a which represents a section along the line I—I in FIG. 2. The profile strips thus consist of a streamlined profile which is symmetrical along its longitudinal centre line (10). The profile's thickest diameter (a) is located in its front region. It tapers away to a point as shown. Between the thickest diameter (a) and the tapering end zone the profile is provided with concave flanks (11).

FIG. 3 shows an embodiment of a rotor with arms offset by 180° which are formed by three nested loops.

FIGS. 4 to 6 show further embodiments of rotors which are formed of two or more nested loops.

FIGS. 7 to 9 show examples of loop-shaped rotor blades whose arms are parallel to each other or converge as they extend outwards from the axis of rotation.

FIGS. 10 and 11 show another rotor which consists of straight rotor blades. Each part of the rotor extending outwards from the rotational axis forms a profiled rotor arm.

The cross-sectional profile of the rotor arms can be seen in FIG. 10a. Here too the profile is symmetrically teardrop-shaped or streamlined.

As can be seen from FIG. 11, consecutive rotor blades are offset by 45° relative to each other. The rotor blades (20) are attached to the shaft (21) at a given axial spacing relative to each other, as shown in FIG. 10.

FIG. 12 illustrates an embodiment in which the arms of the rotor blades (25), which are offset by 180° relative to each other are in the shape of a sine wave. The sine-wave-shaped arms are connected to a hub attached to the rotor shaft in the region of an upwardly curved crown.

FIG. 12 shows a number of rotor blades (25), which are curved in different ways, attached at given spacings to a rotor shaft (2). The height of the curves advantageously decreases as the arms extend outwards. The rotor blades (25) assume therefore approximately the shape of a damped sine wave.

FIG. 12a shows a cross-section through the rotor blades (25) where again the profile is symmetrically teardrop-shaped or streamlined.

The rotor arm illustrated in FIG. 13 consists of four rotor blades (31, 32, 33 and 34) with identical teardrop-shaped profiles which are curved in the form of a sine wave along their longitudinal extension and connected together in the region of their crowns (35). The blades (31 to 34) are curved in the form of damped sine waves. The inner ends of the blades (31 to 34) of the rotor are attached to the rotor hub (36).

Figure 14:
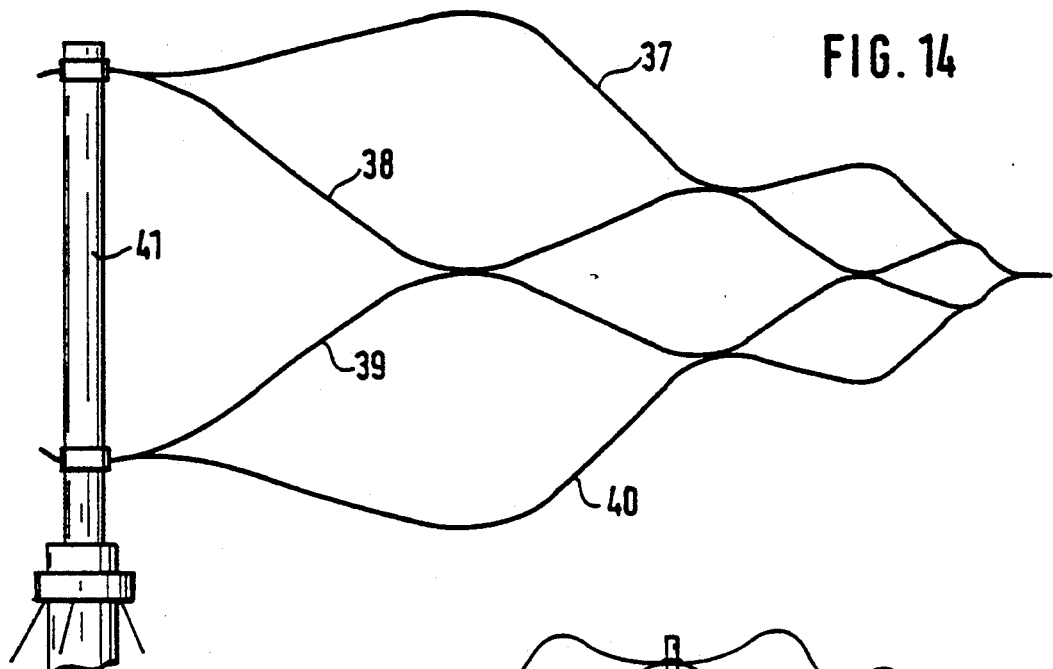
FIG. 14 is a schematic view of another rotor having arms with rounded angles.

In the embodiment according to FIG. 14 the rotor blades (37 to 40) are curved in the form of a zig-zag line with obtuse, rounded angles. The inner ends of the arm's blades are again attached to the rotor hub. The blade cross-section is teardrop-shaped.

Figure 15:
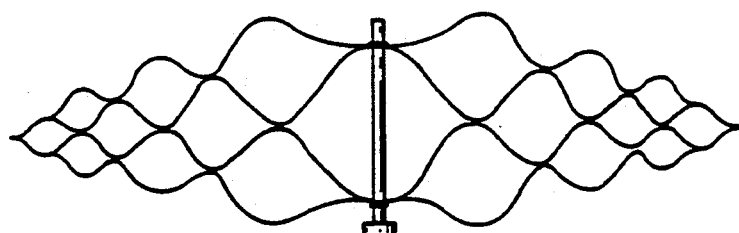
FIG. 15 is a schematic view of another rotor having blades as the arms inverted symmetrically along a central horizontal plane.
Figure 16:
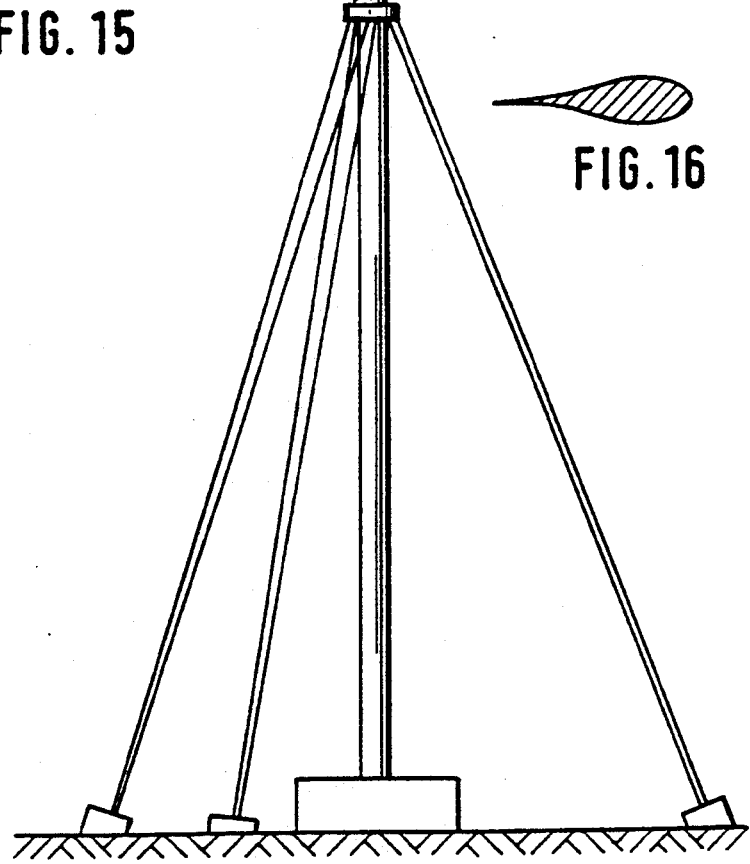
FIG. 16 is a cross-sectional profile of a blade of the rotor of FIG. 15.
Figure 19:
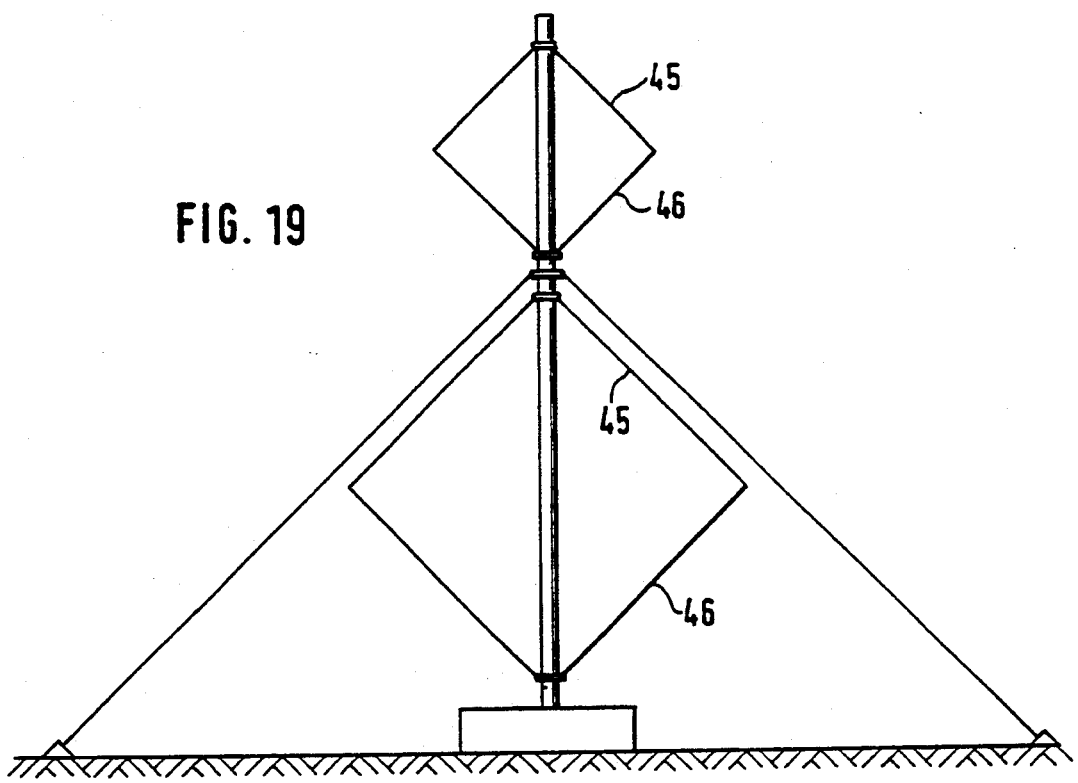
FIG. 19 is a schematic view of another rotor with arms having straight blades.
Figure 19A:
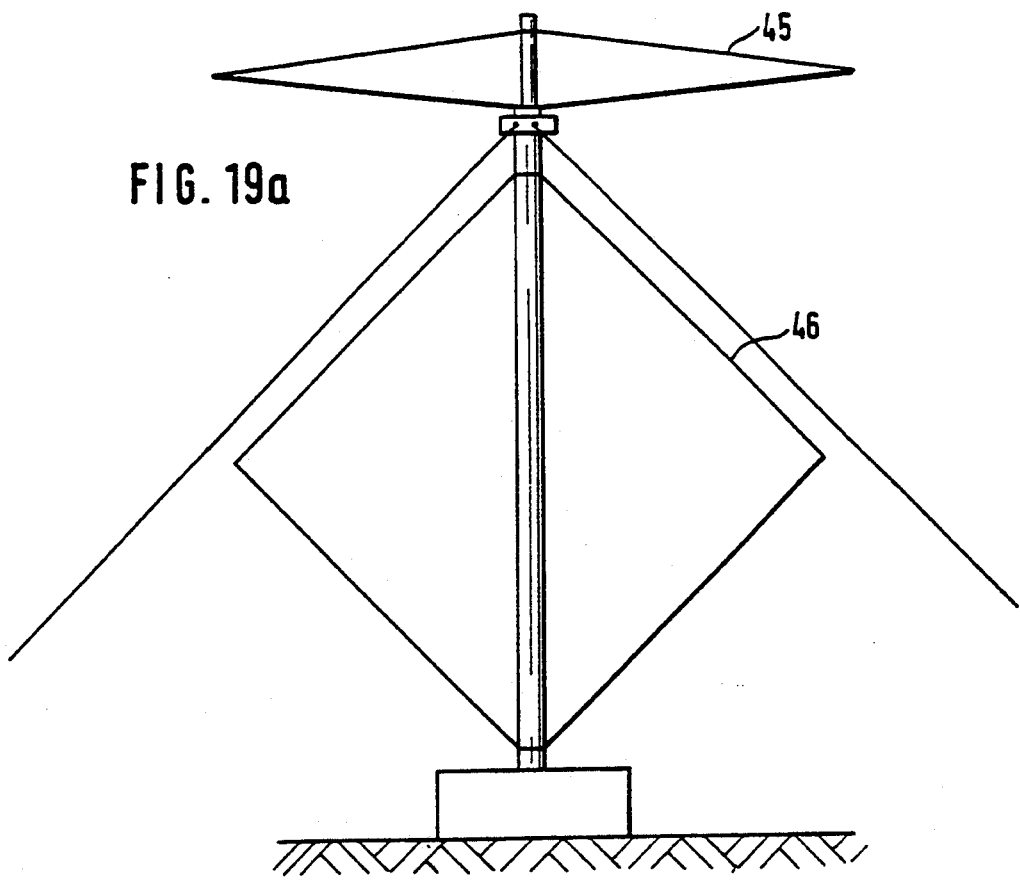
FIG. 19a is a schematic view of a further rotor having arms with straight blades.

FIG. 15 shows a rotor with rotor arms as in FIG. 13. The cross-sectional shape of the individual blades of the arms can be seen in FIG. 16. In the embodiments illustrated in FIGS. 13 to 15 the blades of the arms are located such that they are inverted symmetrically along a centre horizontal plane.

In the embodiment according to FIG. 17 the rotor arms consist of circular profiles (41a) which are attached to the rotor hub (43) by two essentially straight profiles (42) connected approximately tangentially with the circular profiles (41a). The cross-section of the profiles is illustrated in FIG. 17a.

In accordance with the embodiments shown in FIGS. 18, 19, 19a and 20 the arms of the rotor consist of straight blades (45, 46) connected at angles with each other. The cross-section of each blade again has the teardrop shape (47) as shown in FIG. 20a.

Figures 21, 21A:
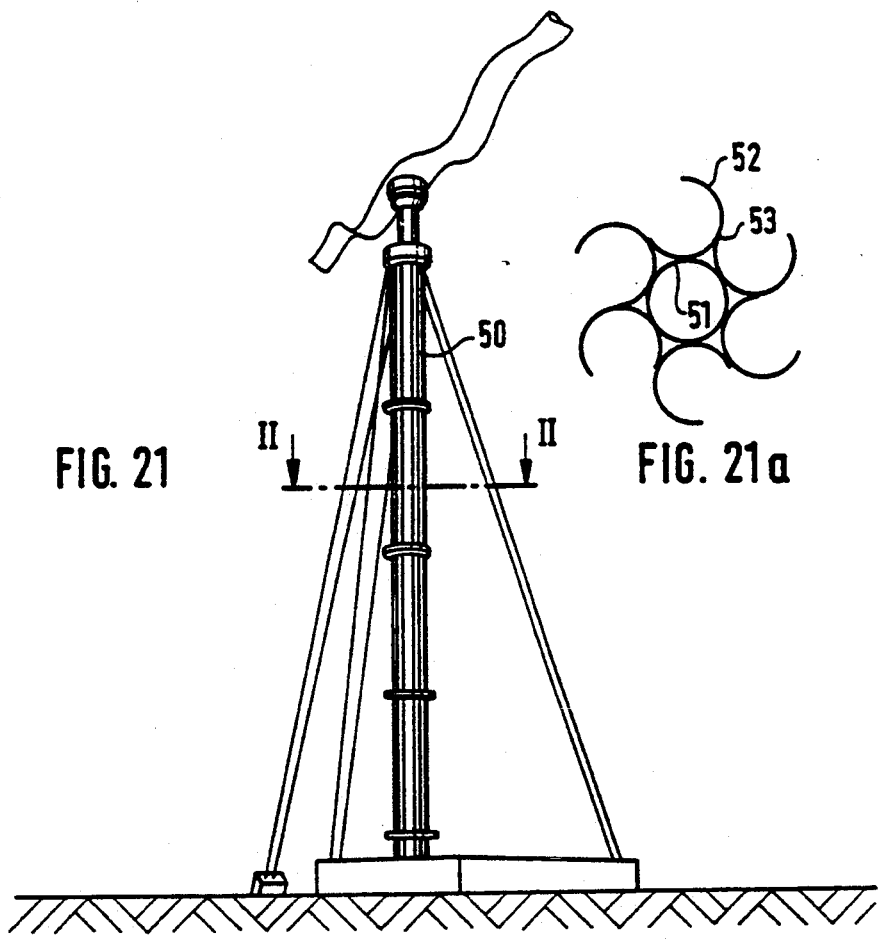
FIG. 21 is a schematic view of a rotor having a drum shaped rotor.
FIG. 21a is a cross-sectional view along the line II—II of FIG. 21.
Figures 20, 20A:
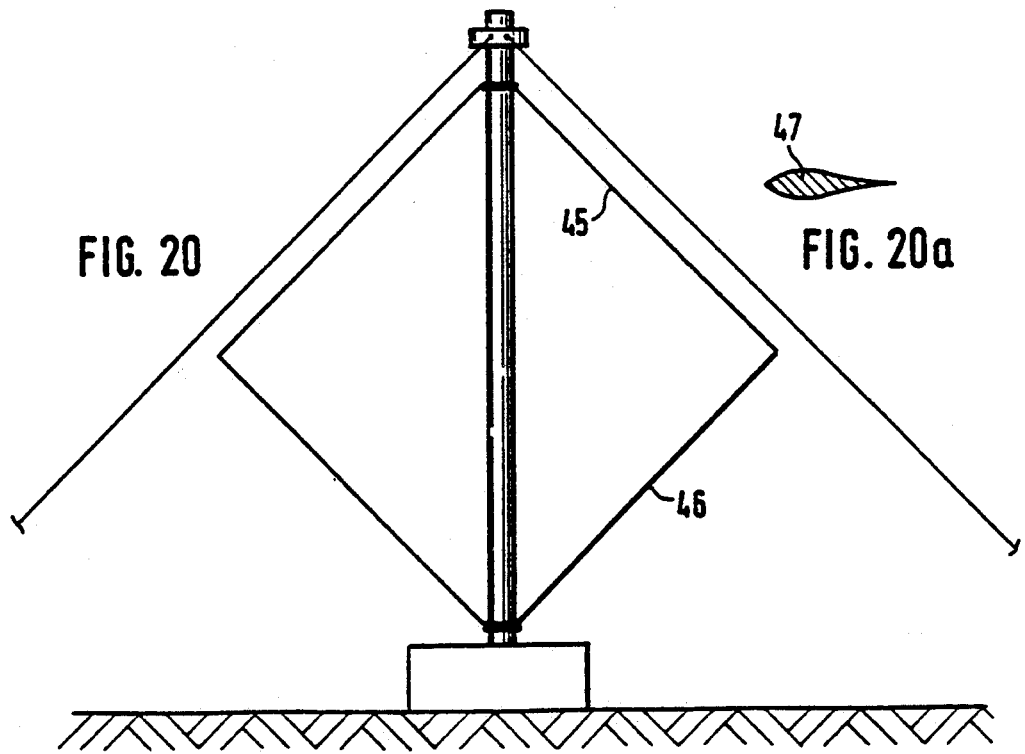
FIG. 20 is a schematic view of yet another rotor having arms with straight blades.
FIG. 20a is a cross-sectional profiles of one of said arms.

The embodiment according to FIG. 21 provides for a drum-shaped rotor (50) whose cross-sectional shape is shown in FIG. 21a (section along the line II—II in FIG. 21). With this rotor (50) semi-circular to three-quarter-circular shells, one lateral edge of each of which is connected approximately tangentially with the sleeve of the preceding shell, are attached to the rotor hub (51) in the form of a ring.

Figure 22A:
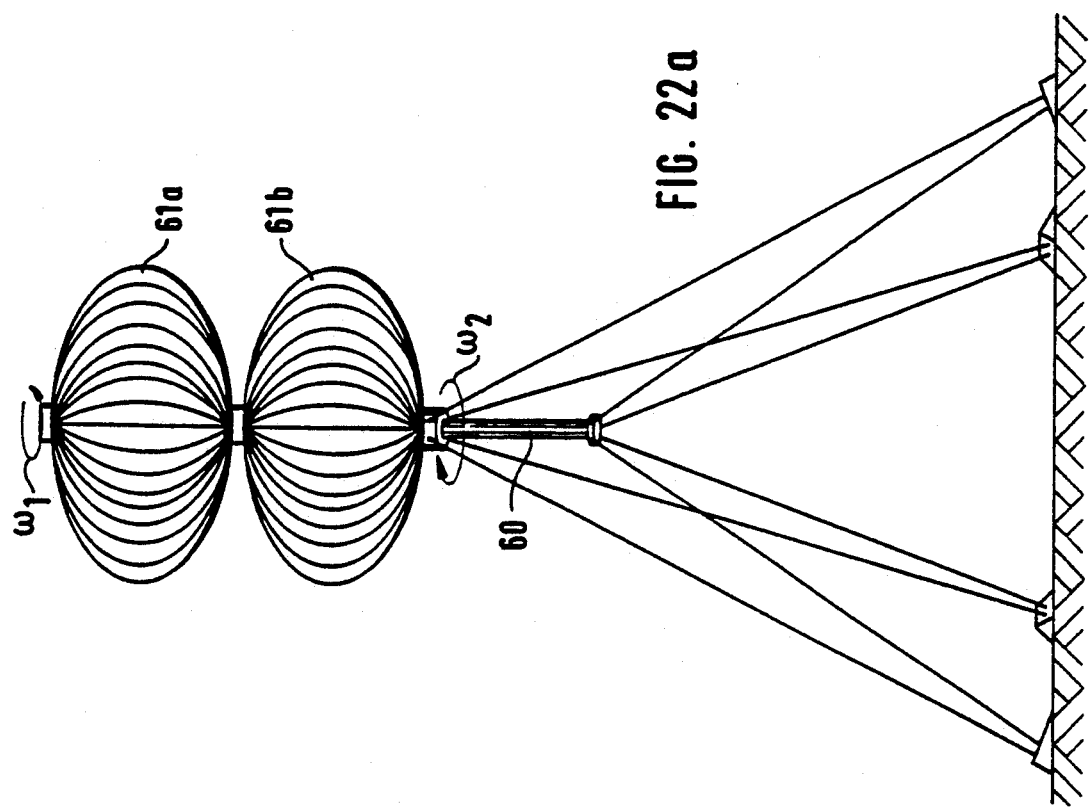
FIG. 22a is a schematic view of a rotor having two balloon-like rotors.
Figure 22:
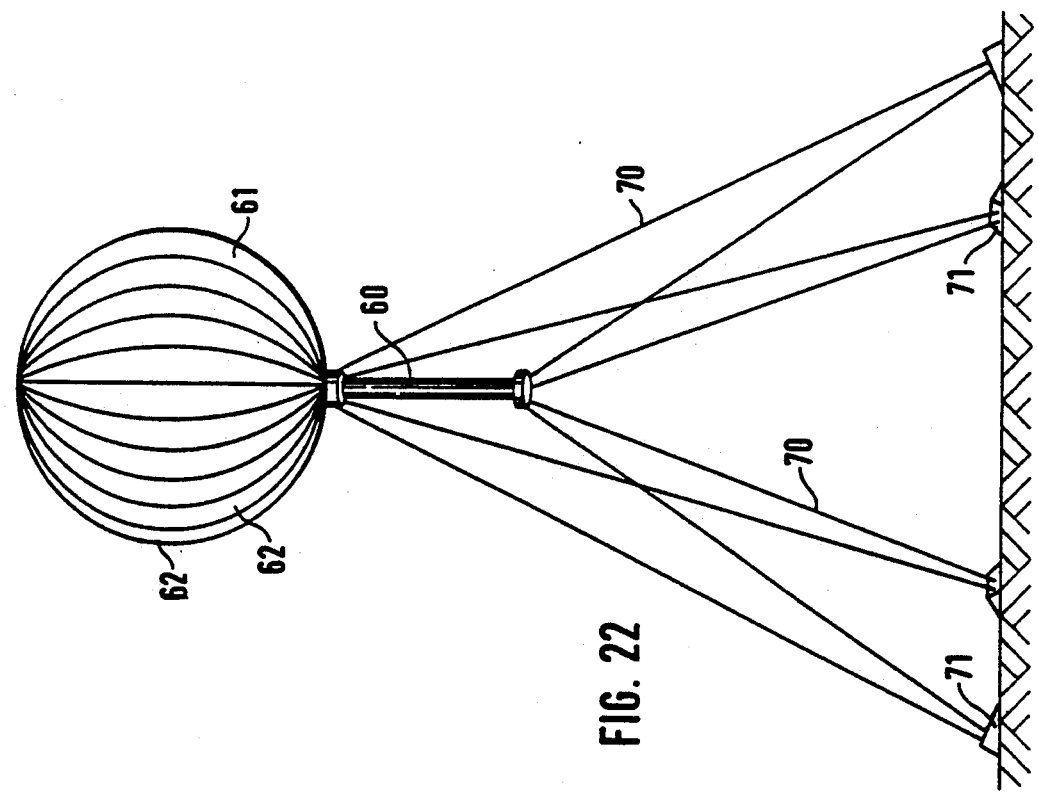
FIG. 22 is a schematic view of a balloon-like rotor.

With the rotor according to FIG. 22 a balloon-like rotor (61) is attached to the rotor shaft 60 such that it can rotate. This balloon-like rotor, which is in the form of a sphere or ellipsoid, consists of sleeve sectors (62) which are curved in an approximate sickle shape. These sleeve sectors have an S-shaped cross-section with an approximately semi-circular to three-quarter-circular arc (63) and an approximately one-quarter-circular opposed arc (64). This design is illustrated particularly clearly in the cross-sectional view of the sphere in FIG. 23. The sleeve sectors are connected along their longitudinal edges. The sleeve sectors which are connected to form a sphere or ellipsoid are attached in the region of their tapered ends to the rotor hub which is mounted on the shaft (60) such that it can rotate. The rotor is filled with a lighter-than-air gas, advantageously helium, with the result that a floating balloon (61) is formed. This is connected by cables (70) to ground-anchored bases (71).

In FIG. 22a two balloon-like rotors (61a) and (61b) are located above each other on a common rotor shaft (60). The sleeve sectors of these two balloon-like rotors are aligned such that the balloon-like rotor (61a) with the angular velocity 1 and the balloon-like rotor (61b) with the angular velocity 2 rotate in precisely opposed directions. In this way, a stabilising effect on the floating double rotor is achieved.

With the embodiments according to FIGS. 24 and 25 the rotor consists of a discus-shaped disc (75). The discus-shaped disc (75) is provided with beads (78) on its dish-shaped upper half (76) and its approximately mirror-image lower half (77) which run from the region of the shaft (79) to the edge (80). The beads (78) have an approximately semi-teardrop-shaped cross-section which can be seen in FIG. 24a.

The beads (78) can also be curved in an arc shape.

Figure 26:
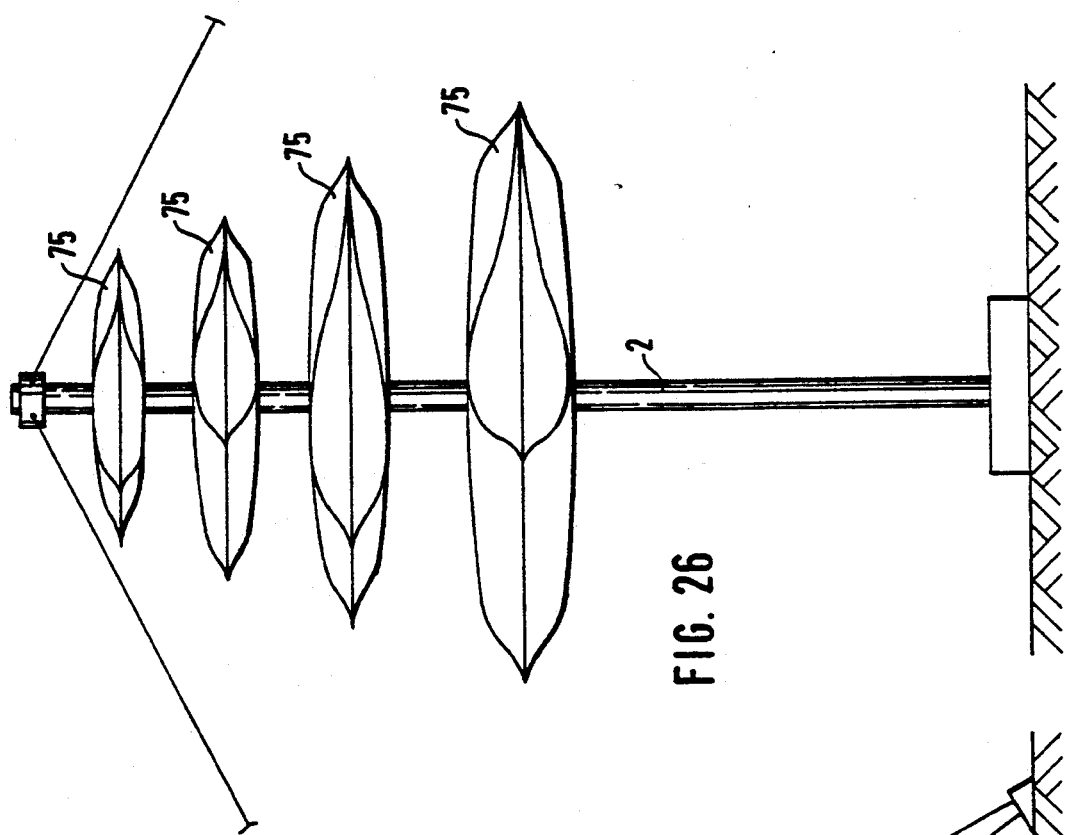
FIG. 26 is a schematic view of a rotor having a plurality of discus-shaped discs.

These discus-shaped discs (75) can be configured in a plurality of vertical layers as shown in FIG. 26. As can be clearly seen in FIG. 26, the discs (75) can continually increase in diameter from the highest disc to the lowest. All discs (75) according to this embodiment are attached with a fixed mounting to a shaft (2).

Figure 27:
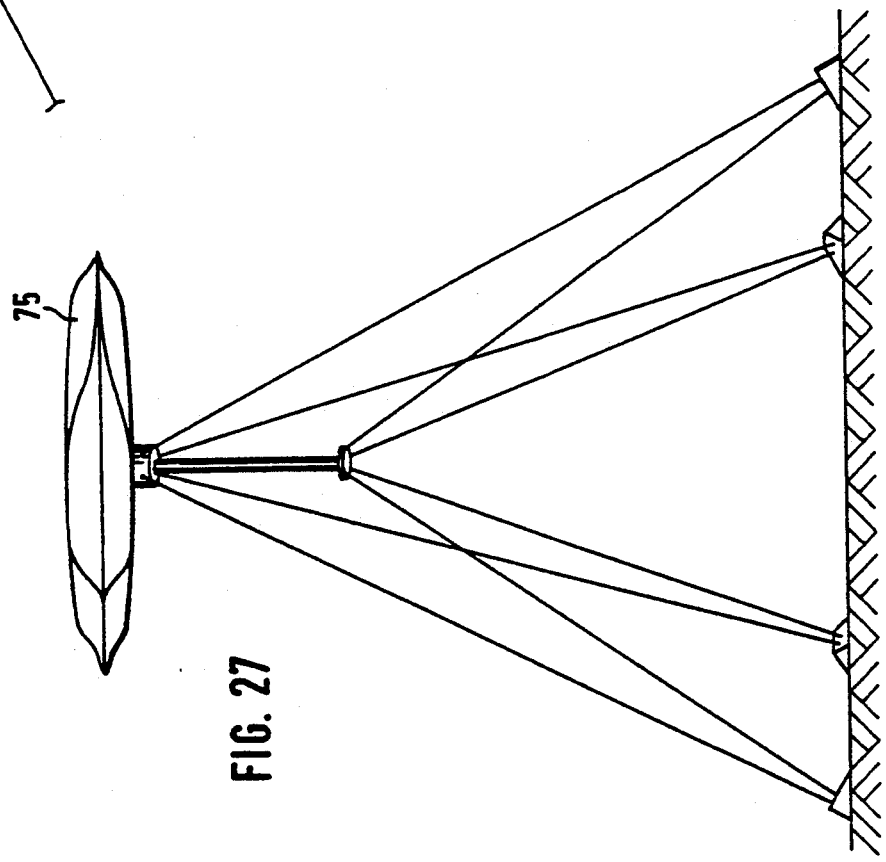
FIG. 27 is a schematic view of another rotor having discus-shaped discs.

The discus-shaped disc rotor (75) can, however, also be constructed as demonstrated in FIG. 27 as a balloon in accordance with FIG. 22; in this case too it is filled with a gas which is lighter than air.

In FIG. 27a, two discus-shaped disc rotors (75) constructed as balloons are configured such that they run in counter-rotating directions, thereby resulting in a centering of the rotor as a whole in the air. The discs are enveloped in loop-shaped rotor arms (81) distributed at uniform spacings over their periphery. One of the profile sides of each rotor arm has a lower air resistance with wind flow at right angles than with wind flow from the opposite side. The length of the loop-shaped rotor arms projecting radially from the vertical rotating axis is greater than the radius of the discus-shaped rotor. Because of the gas-filled, e.g. helium-filled, discus-shaped rotor which rises like a balloon, the loop-shaped rotor arms can be raised to altitudes with more wind without the necessity for an elaborate frame to be provided for a vertical rotor shaft from the ground to the rotors.

FIGS. 28 and 29 show four loop-shaped rotor arms (81) which project radially from the vertical rotating axis, with a right angle being included between each of them. A discus-shaped rotor (75) is located within these rotor arms (81).

With the balloon-type rotors, i.e. the rotors (61 and 75) which are filled with a lighter-than-air gas, electricity can be generated by means of a ring generator (not shown) located within the rotor and transmitted to the ground via appropriate cables.

In case of excessively strong winds or storms, floating rotors can be pulled down by means of the bracing cable (70). To this end the bracing cable (70) can be reeled in by a motorised cable winch (not shown) and thus shortened.

FIG. 30 illustrates another solution according to the invention. A rotor (102) which is mounted such that it can rotate about a vertical axis is connected to a braced vertical mast (101). The rotor blades are attached to a hub or a shaft (103). The rotor has two rotor blades located with a 180° offset relative to each other. Each rotor blade consists of a radial profile section (104, 104') to the end of which one arm (105) facing diagonally downwards and one arm (105') facing diagonally upwards are attached. The arms (105, 105') taper away towards their ends.

The profile sections (104, 104') and the arms (105, 105') are symmetrically teardrop-shaped as illustrated. The cross-sections of the profile sections (104, 104') and the arms (105, 105') are offset by 180° relative to each other with the result that the wind approaches the profiles of the arms once from the rear and once from the front. While the rotor turns there is additionally a propeller action when the wind approaches diagonally.

With reference to its angled arms (105, 105'), the rotor shown has double the effectiveness of a single-blade rotor because the angled arms rotate in spaces which do not overlap and where there is no mutual penetration.

A generator can be connected with the rotor hub and the rotor shaft in the conventional way.

FIG. 31 shows the rotor described above fitted with supplementary stabiliser blades (106, 106'). FIG. 31a shows the aerodynamic, almost teardrop-shaped cross-sectional profile of the profile sections (104, 104') and the arms (105, 105'). FIG. 31b, on the other hand, shows the profile of the stabiliser blades (106, 106') which is approximately half a teardrop shape along its centre line of symmetry. In this way, this stabiliser blade resembles an aerofoil. The ultimate design of the stabiliser blade depends on the component of force which must be generated in order to equalise the component of force in the direction of flexing acting on the arms (105, 105') as a result of the mean centrifugal force.

A further embodiment is shown in FIG. 32 in which the rotor blades are again attached to the shaft (103). Each rotor blade consists of a radial profile section (104, 104') at each end of which a diagonally downward-facing and a diagonally-upward facing arm (105, 105') are attached. The arms (105, 105') taper away towards the end of this embodiment too. Again, almost horizontal stabiliser blades are attached to the tapered ends of each arm (105, 105'). Thus each rotor blade is almost in the shape of a prone X. FIG. 32a shows the cross-section through the profile sections (104, 104') and the arms (105, 105'). FIG. 32b shows the cross-section through the stabiliser blades (106, 106').

FIG. 33 shows an embodiment according to the invention with a rotor consisting of a plurality of rotor arms configured in vertical layers in the form of triangular stirrups. Tubular hubs (202), to which rotor arms (203) in the form of isosceles triangles are attached, are mounted on a vertical, fixed axis braced by cables (201). Above the bracing collar (204) two arms (203) are provided which are offset by 180° relative to each other and have the greatest radial length. Below the bracing collar (204) triangular rotor arms, the radial length of which increases from top to bottom, are attached in vertical layers to the hub (202).

The rotor arms (203) are each offset by 180° relative to each other and lie in a vertical plane. It is possible for more than two rotor arms to be attached to the hub at each level with equal angular spacings. In FIG. 33a the teardrop-shaped and streamlined cross-sectional profile of the rotor arms (203) is illustrated.

Figure 34:
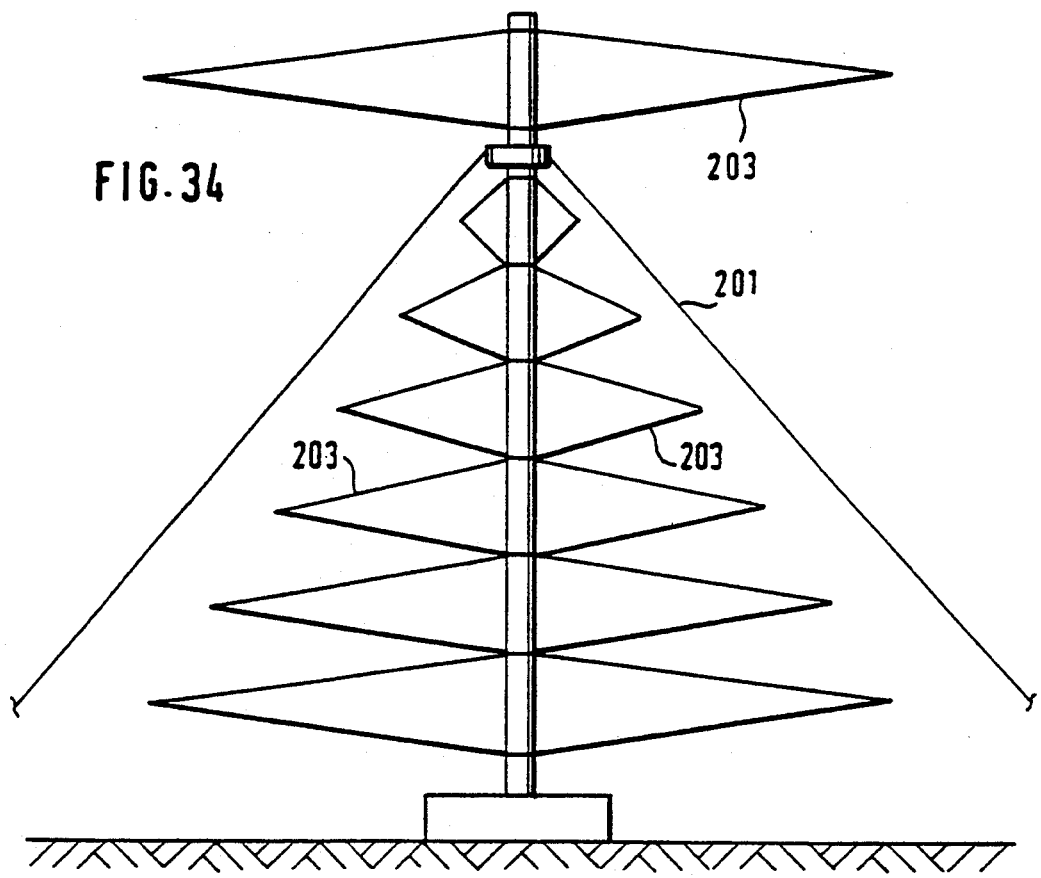
FIG. 34 is a schematic view of another rotor.

FIG. 34 shows a rotor which essentially corresponds to FIG. 1 in a somewhat modified geometrical form.

Figure 35:
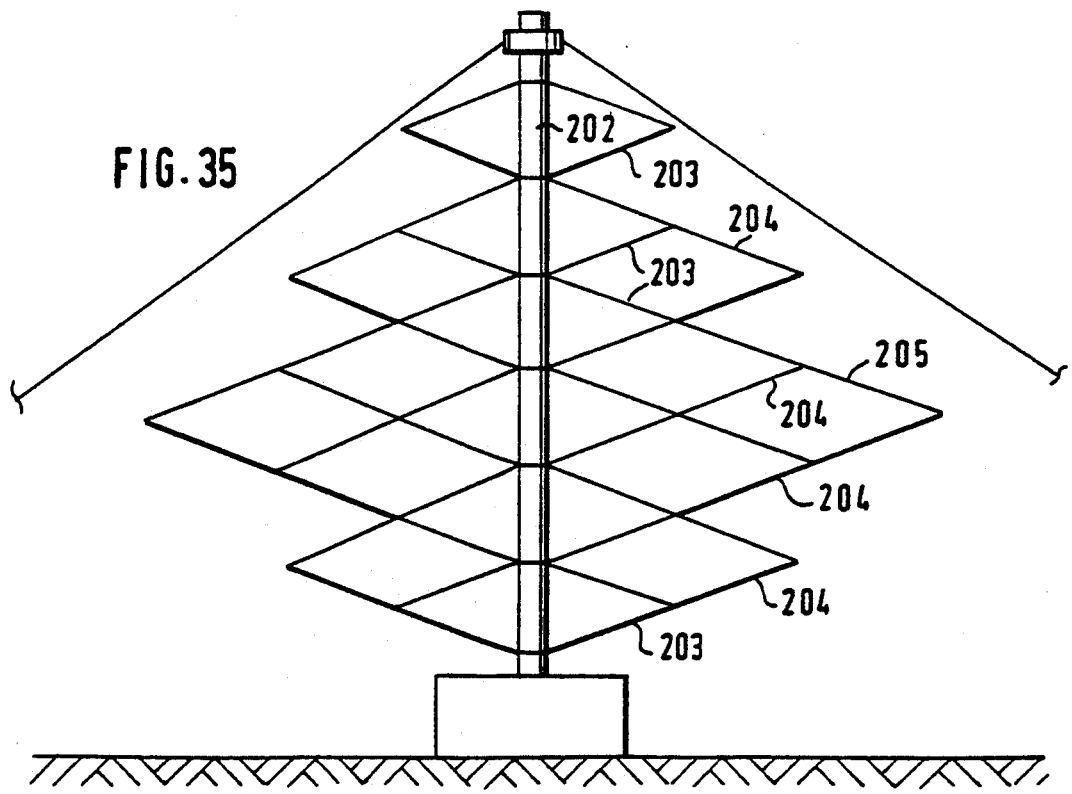
FIG. 35 is a schematic view of a rotor having triangular rotor arms.

In the embodiment according to FIG. 35, triangular rotor arms (203) are initially attached in vertical layers to hubs (202), where the radial length of these arms (203) is the same. Adjacent tips of triangular rotor arms (203) are extended by triangular rotor arms (204) resulting in a diamond-shaped pattern being formed by the profiles. The tips of two adjacent triangular rotor arms (204) can in turn be extended by a triangular rotor arm (205). As shown in FIG. 35, this can be carried out in steps such that, despite the use of the same rotor arms in triangular form, rotors of varying radius over their height can be created. The rotor shape presented here is characterised particularly in that the same prefabricated components can be used and that the rotor can be adapted in modular form to the site, i.e. to the weather conditions prevailing there.

Figure 36:
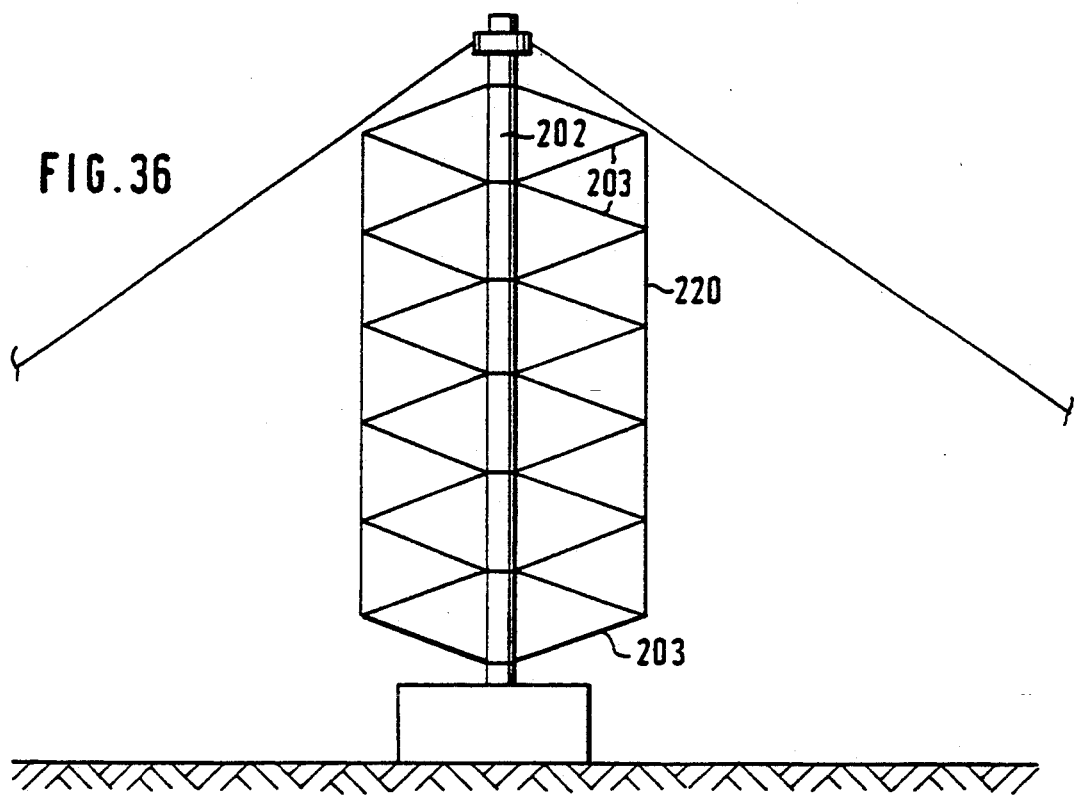
FIG. 36 is a schematic view of a rotor shape having the rotor arms configured in layers in the form of triangles.

FIG. 36 shows a further rotor shape in which the rotor arms (203) are configured in layers in the form of isosceles triangles of the same radial length. The tips of the triangles are connected together by a straight profile section (220). No further mention, of course, need be made here of the fact that all the rotor arms illustrated here each have the cross-sectional surface described, for example, in FIG. 33a.

Figure 37:
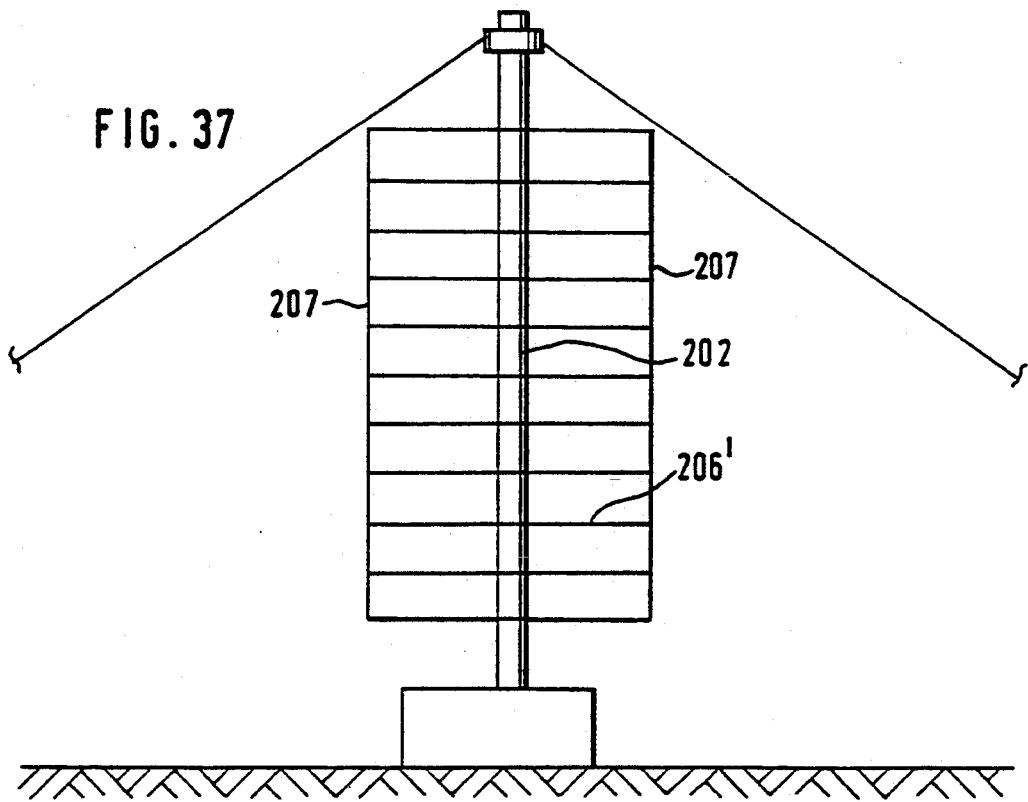
FIG. 37 is a schematic view of a rotor having horizontal rotor blades.

In the embodiment according to FIG. 37 horizontal rotor blades, which are connected together by vertical outer edge profiles (207), are configured in vertical layers at equidistant spacings on the hub (202).

Figure 38:
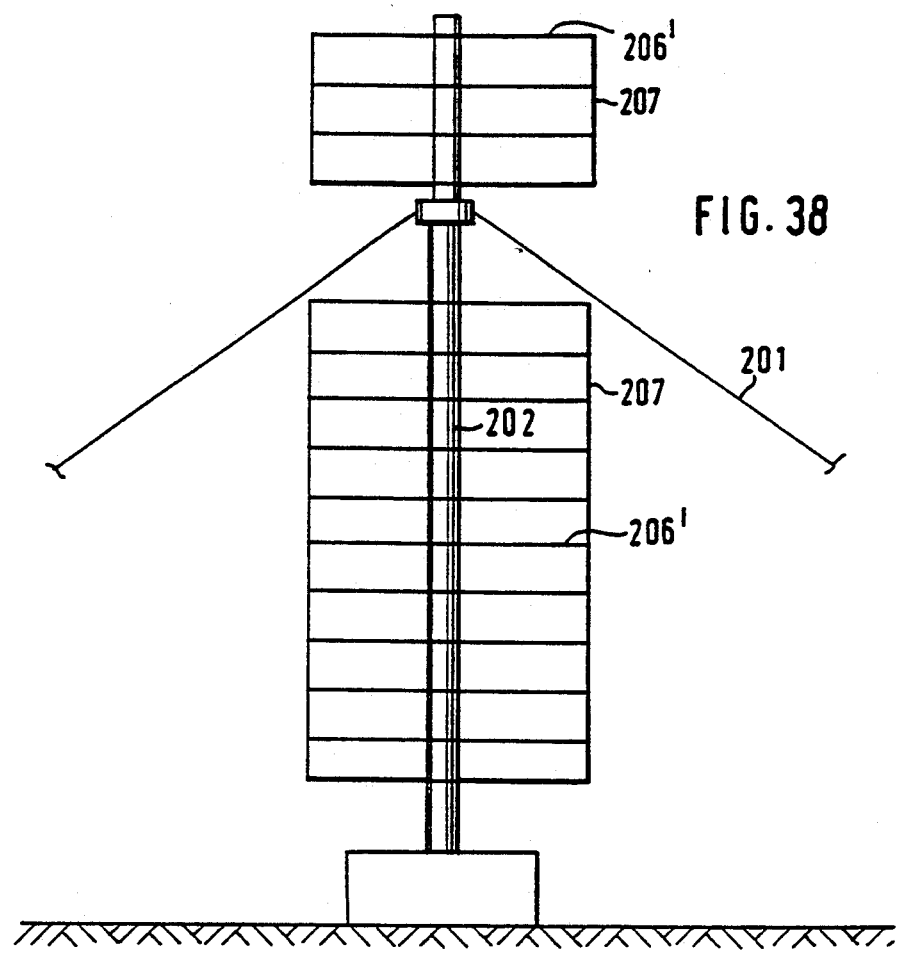
FIG. 38 is a schematic view of a rotor having horizontal rotor arms and a smaller rotor with horizontal arms and a smaller rotor with horizontal arms thereabove.

FIG. 38 shows a similar embodiment to FIG. 37, where the only difference is that above the bracing cable a further, somewhat smaller, rotor with horizontal rotor arms (206'), which are also connected together by vertical outer edge profiles (207), is formed.

Figure 39:
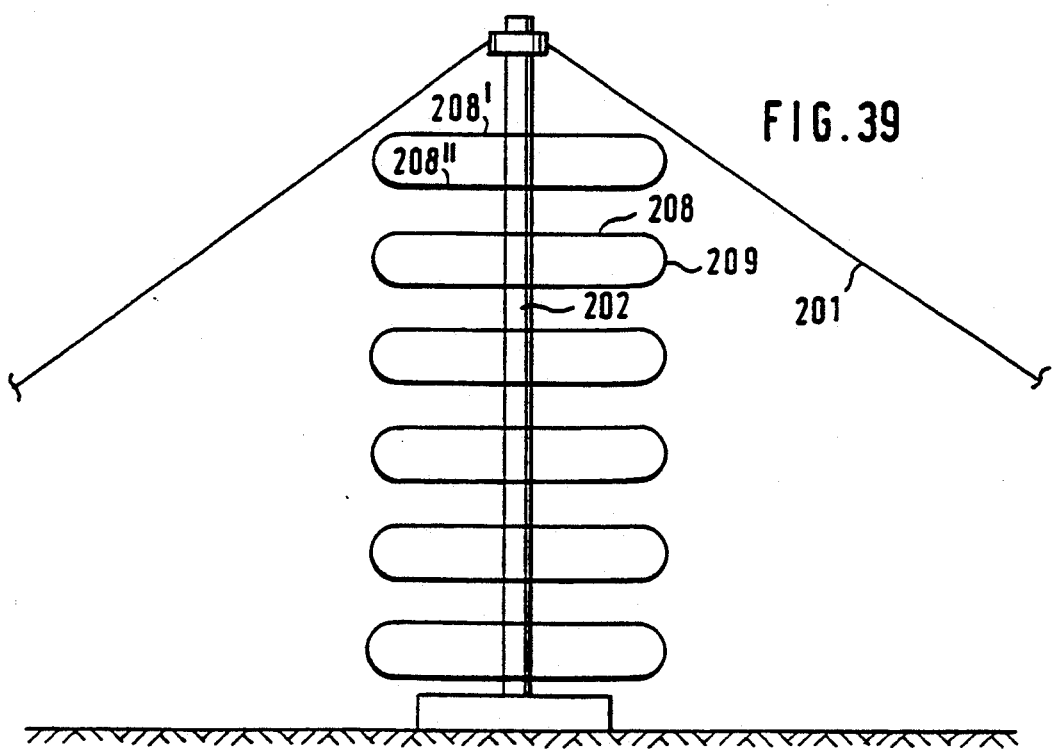
FIG. 39 is a schematic view of a rotor having hairpin-shaped shaped rotor arms.

In the embodiment illustrated in FIG. 39 hairpin-shaped rotor arms (208) are attached to the hub (202). The rotor arms (208) consist of parallel configured arms (208', 208") which are connected to each other by means of circular profile sections (209). All the components of the rotor arms (208), particularly the circular profile sections (209), can be prefabricated and simply assembled as prefabricated components at the final assembly stage by connecting them together and joining them to make the finished rotor arm.

Figure 40:
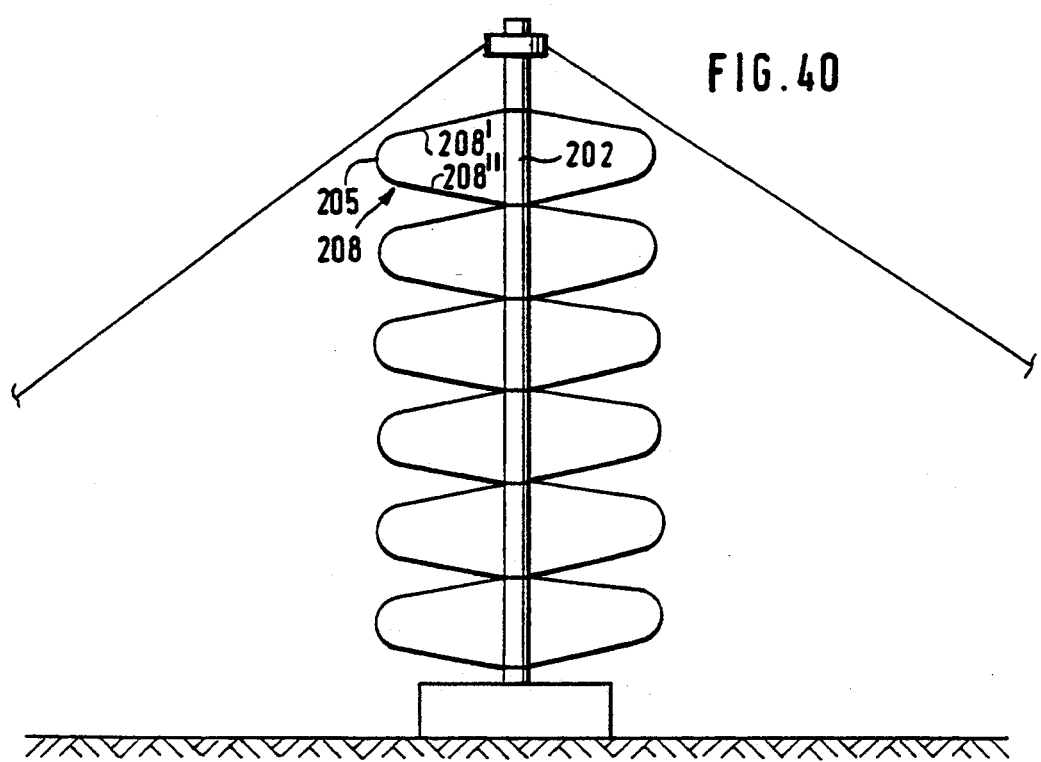
FIG. 40 is a schematic view of another rotor configuration.

FIG.40 shows a rotor configuration essentially as in FIG. 39, although here the arms (208' and 208") converge diagonally. With this version too, the arms are connected to each other by means of prefabricated circular profile sections (209).

Figure 41:
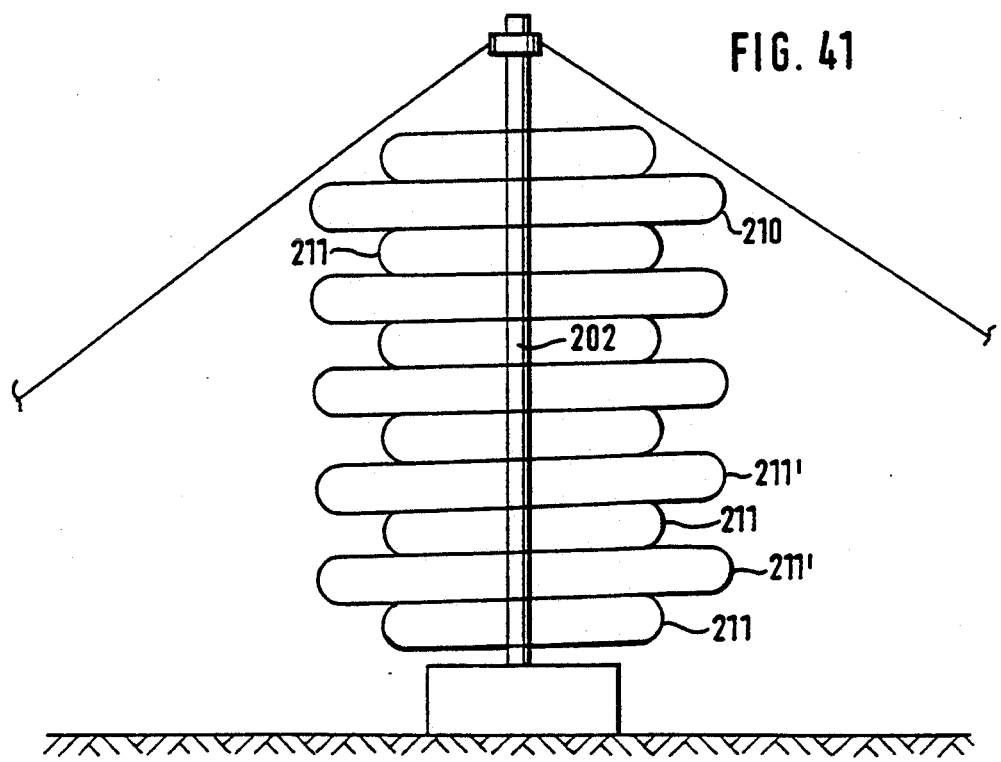
FIG. 41 is a schematic view of another rotor having hairpin-shaped rotor arms.

In the embodiment according to FIG. 41 hairpin-shaped rotor arms (210) are configured in vertical layers where adjacent rotor arms are additionally connected together by means of curved profile sections (211). Consecutive curved profile sections (211, 211') have varying radial distances from the rotor hub (202).

Figure 42:
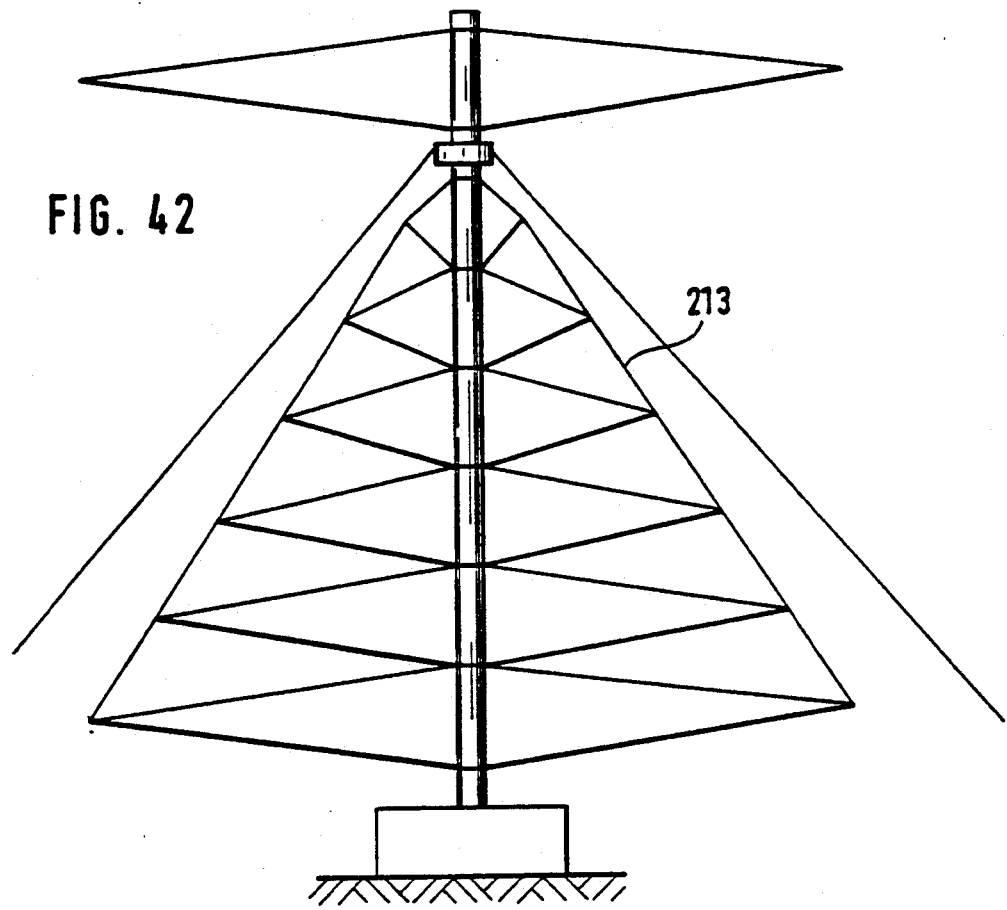
FIG. 42 is a schematic view of a further rotor.

The embodiment of the rotor according to FIG. 42 corresponds to that of FIGS. 33 and 34 with the difference, however, that the radial outer tips of the triangular rotor arms are connected together by means of diagonal profile sections (213).

Figure 43:
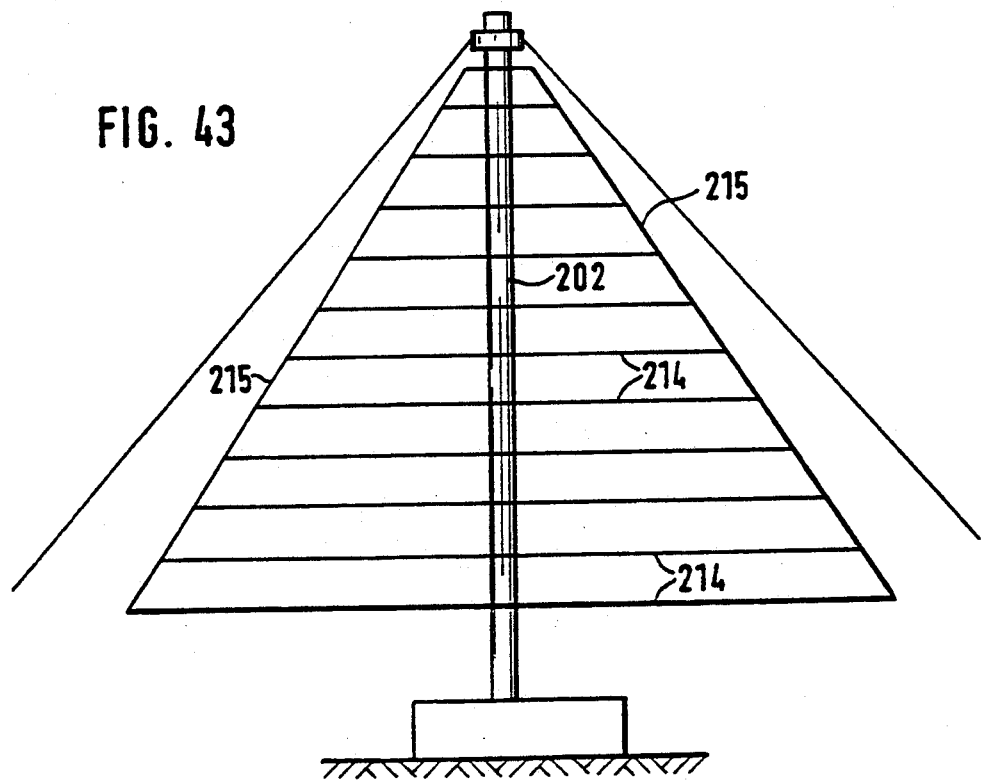
FIG. 43 is a schematic view of another rotor.

In the embodiment according to FIG. 43, rotor blades (214) whose radial outer ends are connected together by means of diagonal profiles (215), are positioned horizontally and parallel on the hub (202).

In the embodiment according to FIG. 44, the parallel rotor blades (214') are connected together at their free ends by means of profiles (216, 217) which are in the shape of isosceles triangles.

The rotor arms formed by the profile sections are advantageously offset by 180° relative to each other and thus lie in a vertical plane.

It is self-evident that more than two rotor blades can be configured in a horizontal plane; they would then be configured at uniform angular intervals relative to each other as a function of their number.

The rotor blades or arms indicated in the drawings by straightforward lines have an extended streamline or teardrop shape as can be seen, for example, in FIG. 33a.

The vertical rotor illustrated in FIG. 45 has a rotor arm (300). This rotor arm (300) is an integral part of the vertical rotating shaft (301). This offers the advantage that no rotating parts are needed on the rotating shaft. The rotating shaft is mounted in a bearing directly below ground level.

A first rotor arm section (303) which, starting from the rotating shaft, faces diagonally away from the centre line of rotation of the rotor as a whole (304) is connected to the rotating axis (301). A further rotor arm section (304) which in turn faces diagonally towards the centre line of rotation (304) is joined to the rotor arm section (303). This further rotor arm section projects beyond the centre line of rotation (304). Beyond the centre line (304) the flow profile of the rotor arm, which is shown in a cross-sectional view in FIG. 45a, is offset by 180°. The rotor arm section (304') tapers away towards its tip. Since this is a single-arm rotor it achieves a higher angular velocity in comparative terms. As a result high centrifugal forces occur which act particularly on the rotor arm section (304). In order to equalise these forces, an essentially horizontal stabiliser wing (305) is located on the tapered tip of the rotor arm section (304). The cross-sectional profile of this stabiliser wing (305) is shown in FIG. 45b as a semi-teardrop shape or aerofoil shape.

FIG. 46 illustrates an embodiment which is formed by the combination of two single-arm rotors as shown in FIG. 45. According to this, the rotating axis (301) has connected diagonally upwards to it first rotor arm sections (303) lying in a vertical plane to which the further rotor arm sections (304) are joined, which intersect at the centre line (304') and each project beyond this. Stabiliser wings (305) are located at the ends. FIGS. 46a and 46b show the appropriate cross-sections of the rotor arm sections (303, 304) and the stabiliser wings (46), respectively. In FIG. 46c a further version of the embodiment according to FIG. 46 is illustrated in which additionally a stabilising flat rotor (306) is provided which is aligned horizontally and transects the two lateral corner points of the rotor arm rectangle which is formed by the rotor arm sections (303, 304) and is standing on one of its corners. The stabilising flat rotor can have a shape which is essentially as illustrated in FIGS. 10, 10a and 11.

Figure 48:
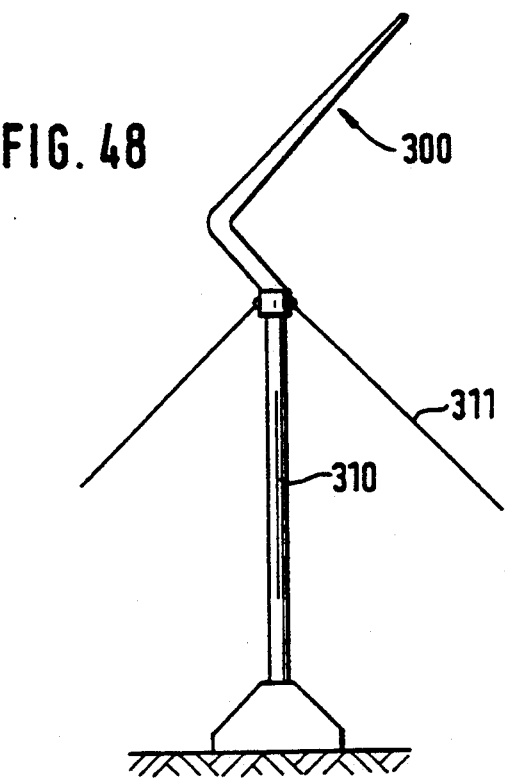
FIG. 48 is a schematic view of another rotor having a single rotor arm.

The embodiment according to FIG. 48 corresponds essentially to that of FIG. 46 except that one side of the further rotor arm section (304) was not extended over the centre line (304'). In addition, this embodiment has no stabiliser blade.

In all the embodiments illustrated above where the vertical rotating axis is formed as an integral part of the rotor arm(s), the pivot bearing is housed on the ground. In this way it is advantageously protected against climatic influences. For this reason, the use of a rotor of this type could be suitable for very cold regions, e.g. permafrost regions. If necessary, the rotor arms can be manufactured hollow and filled with heated gas to prevent the rotor blades from icing up.

As illustrated in the embodiment according to FIG. 48, the rotor blades (300) in accordance with the embodiments as per FIGS. 45 to 47 can be configured on a mast (310) braced by anchor cables (311); in this case, an appropriate bearing must be provided for the rotor (300) at the tip of the mast (310).

Figure 49:
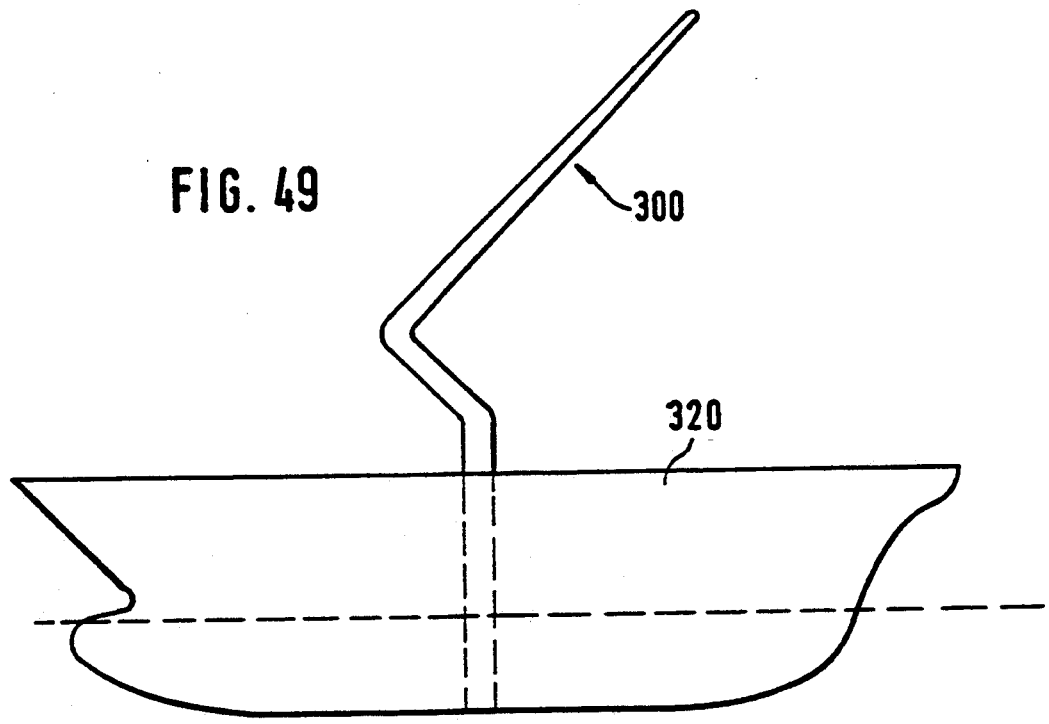
FIG. 49 is a schematic view of a rotor for mounting on a ship.

A rotor (300) can also be located on a ship, as illustrated in FIG. 49. The use of a vertical wind rotor on board ship offers the advantage that the unhindered wind energy available on the open sea can be exploited. A ship equipped with a wind energy converter can be used for decentralised power generation. For example, the electricity produced by the generator can be used to manufacture hydrogen which can then be stored in appropriate hydrogen stores on the ship. It is self-evident that each of the vertical rotor forms described within the confines of this invention can advantageously be used for decentralised power generation on a ship (320). It is also possible to utilise the invention on a ship other than an energy-generating ship, for example to provide power on a conventional passenger ship or freighter which can have a plurality of smaller wind energy converters with vertical rotors, as appropriate.

In the embodiment according to FIG. 50 a particularly advantageous form of the bearing of a vertical rotor (300) is illustrated. To this end, a suitable pit (340) is dug in the ground (330). The pit (340) is filled with water. A buoyancy device (350) is floating in the water. This buoyancy device is centred in the water-filled pit (340) which is schematically represented in FIG. 50 by the appropriate tip of the triangle. The buoyancy device (350) is gas-filled. The vertical rotor (300) is attached to the buoyancy device (350) with a fixed mount, as a result of which the buoyancy device (350) rotates in the water-filled pit (340). An enclosed area (not shown) of the pit (340) can accommodate a generator for power generation which is connected to the buoyancy device, and thence to the rotor (300) by means of an appropriately water-tight rotary transmission leadthrough. FIG. 50 also does not show brushes projecting from the buoyancy device (350) which result on the one hand in a braking effect and, on the other, in a temperature increase. The water warmed in this way can also be used energetically, with the result that the overall power conversion efficiency from the available wind can be improved with this embodiment.

FIGS. 51 and 52 show a wind-powered vertical rotor (400) in which a disc (402) in the form of a float which partially projects above the surface of the water is connected to a rotating shaft (401) which leads underwater to an enclosed generator (not shown). A first rotor arm (403) extends from the outer edge of the disc (402) diagonally towards the centre line of rotation (404). On the far side of the centre line (404) the profile of the rotor arm (403) is offset by 180°. The rotor arm (403) tapers away upwards, and on its end is located a stabiliser blade (405) which in terms of construction and function corresponds to the stabiliser blades already described with reference to preceding embodiments. Further rotor arms (406, 407) proceed from two other edge locations on the disc towards the centre line (404). These are equipped on the one hand as appropriate rotor wings while also functioning as supports for the rotor arm (403).

A common feature of all the rotors according to the invention is that they consist of easily manufactured, prefabricated components. The various individual components can, for example, consist of bent sheet metal or a carbon laminate which has particularly high-tensile properties. In this way, simple construction is guaranteed for the assembly of the vertical rotors. The modular construction features permit individual adaptation of the rotor shape to local wind conditions. This means that no complicated control system is necessary, since the vertical rotors are ruggedly designed. As a result of these properties, these vertical rotors are particularly suitable for applications in developing countries where, on the one hand, no manufacturing facilities are available for complex control mechanisms and the like and, on the other, no qualified personnel are available for maintenance work on high-technology machines or equipment.

A further advantage is that the vertical rotors described are almost silent.

I claim:

1. Rotor driven by wind power with a vertical rotating axis and radial rotor arms mounted thereon which are distributed at uniform angular intervals over a periphery thereof and which form and bear rotor arms with an aerodynamic profile such that one side of the profile exhibits a lower air resistance with a current at right angles than with a current from the opposite side wherein the rotor arms consist of at least one loop lying in vertical planes with aerodynamic profiles, where the profile shape is substantially constant over the entire length of the loop, wherein said loops consist of arms diverging at an angle from the region of the vertical rotating axis or the region of a hub attached thereto, said loops having radial outer zones connected with each other by circular arc-shaped profile strips, and several nested profile loops sharing the same arms and formed by inner loops having circular arc-shaped profile strips disposed closer to the rotating axis than outer loops thereof.

2. Rotor according to claim 1 wherein two arms which are at an angle relative to each other extend essentially in a straight line.

3. Rotor according to claim 1 wherein arms of the rotor arms opposed to each other by 180° are X-shaped.

* * * * *